United States Patent
Li et al.

(10) Patent No.: US 9,239,402 B2
(45) Date of Patent: Jan. 19, 2016

(54) FOCUSED ARRAY LATEROLOG TOOL

(75) Inventors: Shanjun Li, Sugar Land, TX (US);
Michael S. Bittar, Houston, TX (US)

(73) Assignee: Halliburton Energy Services, Inc.,
Houston, TX (US)

( * ) Notice: Subject to any disclaimer, the term of this patent is extended or adjusted under 35 U.S.C. 154(b) by 0 days.

(21) Appl. No.: 14/370,188

(22) PCT Filed: Jan. 3, 2012

(86) PCT No.: PCT/US2012/020082
§ 371 (c)(1),
(2), (4) Date: Jul. 1, 2014

(87) PCT Pub. No.: WO2013/103337
PCT Pub. Date: Jul. 11, 2013

(65) Prior Publication Data
US 2015/0134254 A1     May 14, 2015

(51) Int. Cl.
*G01V 3/02* (2006.01)
*G01V 3/20* (2006.01)
*G01V 3/24* (2006.01)
*G01V 99/00* (2009.01)

(52) U.S. Cl.
CPC .. *G01V 3/20* (2013.01); *G01V 3/24* (2013.01); *G01V 99/00* (2013.01)

(58) Field of Classification Search
CPC .............. G01V 3/28; G01V 3/24; G01V 3/20
USPC ................................................. 324/357, 347
See application file for complete search history.

(56) References Cited

U.S. PATENT DOCUMENTS

| 3,256,480 A | 6/1966 | Runge et al. |
| 3,772,589 A | 11/1973 | Scholberg |
| 4,675,611 A | 6/1987 | Chapman et al. |
| 4,677,386 A | 6/1987 | Chapman et al. |
| 5,343,153 A | 8/1994 | Davies et al. |

(Continued)

FOREIGN PATENT DOCUMENTS

| EP | 0544583 A1 | 6/1993 |
| EP | 0759563 A2 | 2/1997 |

(Continued)

OTHER PUBLICATIONS

"International Application Serial No. PCT/US2012/020082, International Preliminary Report on Patentability mailed Mar. 11, 2014", 6 pgs.

(Continued)

*Primary Examiner* — Reena Aurora
(74) *Attorney, Agent, or Firm* — Schwegman Lundberg & Woessner, P.A.; Benjamin Fite

(57) ABSTRACT

Various embodiments include apparatus and methods to make resistivity measurements in a borehole using tool having an array of electrodes operable to provide focused currents and measure corresponding voltages to determine resistivity. Tools can be configured with a main electrode having a number of spaced apart electrodes within the main electrode such that the spaced apart electrodes are arranged azimuthally with respect to an axis of the tool. Generation of current from the spaced apart electrodes and control of current from additional electrodes on each side of the main electrode can provide for focused measurements. Additional apparatus, systems, and methods are disclosed.

26 Claims, 14 Drawing Sheets

(56) References Cited

U.S. PATENT DOCUMENTS

| | | | | |
|---|---|---|---|---|
| 5,852,363 | A | * | 12/1998 | Smits ........................... 324/373 |
| 6,023,168 | A | * | 2/2000 | Minerbo ...................... 324/373 |
| 7,027,967 | B1 | | 4/2006 | Barber |
| 8,775,084 | B2 | * | 7/2014 | Rabinovich et al. .............. 702/7 |

FOREIGN PATENT DOCUMENTS

| | | |
|---|---|---|
| GB | 2283324 A | 3/1995 |
| WO | WO-2013103337 A1 | 7/2013 |

OTHER PUBLICATIONS

"International Application Serial No. PCT/US2012/020082, International Search Report mailed Feb. 1, 2013", 3 pgs.

"International Application Serial No. PCT/US2012/020082, Written Opinion mailed Jan. 2, 2014", 6 pgs.

"International Application Serial No. PCT/US2012/020082, Written Opinion mailed", 5 pgs.

"European Application Serial No. 12703181.3, Examination Notification Art. 94(3) mailed Apr. 17, 2015", 4 pgs.

"International Application Serial No. PCT/US2012/020082, Response filed Nov. 1, 2013 to Written Opinion mailed Feb. 1, 2013", 11 pgs.

Davies, D. H., et al., "Azimuthal Resistivity Imaging: A New Generation Laterolog", SPE Formation Evaluation, 9(3), (1994), 165-174.

Galli, M. T., et al., "Resistivity Modeling of Array Laterolog Tools: An Application in an Offshore Norway Clastic Reservoir", SPE 77714, SPE Annual Technical Conference and Exhibition, Sep. 29-Oct. 2, San Antonio, Texas, (2002).

Griffiths, R., et al., "Better Saturation from New Array Laterolog", SPWLA 40th Annual Logging Symposium, May 30-Jun. 3, Oslo, Norway, (1999), 1-14.

Smits, J. W., et al., "High Resolution From a New Laterolog With Azimuthal Imaging", SPE 30584, SPE Annual Technical Conference and Exhibition, Oct. 22-25, Dallas, Texas, (1995), 563-576.

Smits, J. W., et al., "Improved Resistivity Interpretation Utilizing a New Array Laterolog Tool and Associated Inversion Processing", SPE-49328-MS, SPE Annual Technical Conference and Exhibition, Sep. 27-30, New Orleans, Louisiana, (1998), 1-14.

Chen, Yong-Hua, et al., "A Novel Array Laterlog Method", The Log Analyst, 39(5), (1998), 23-30.

\* cited by examiner

```
┌─────────────────────────────────────────────────────────────────┐
│ GENERATE CURRENT FROM EACH ELECTRODE OF A NUMBER OF SPACED      │
│ APART ELECTRODES WITHIN A MAIN ELECTRODE OF A TOOL DISPOSED IN A│
│ BOREHOLE, THE SPACED APART ELECTRODES ARRANGED AZIMUTHALLY      │
│ WITH RESPECT TO AN AXIS OF THE TOOL, THE SPACED APART           │
│ ELECTRODES ARRANGED WITH RESPECT TO A MAIN MONITOR ELECTRODE    │
│ FOR THE MAIN ELECTRODE                                          │
└─────────────────────────────────────────────────────────────────┘
                                                            ⎩ 210

┌─────────────────────────────────────────────────────────────────┐
│ CONTROL CURRENT FROM EACH OF A FIRST NUMBER OF ELECTRODES TO    │
│ ONE SIDE OF THE MAIN ELECTRODE ALONG THE AXIS AND FROM EACH OF A│
│ SECOND NUMBER OF ELECTRODES ON ANOTHER SIDE OF THE MAIN         │
│ ELECTRODE ALONG THE AXIS, THE CURRENT CONTROLLED ACCORDING TO   │
│ A SELECTED CURRENT PATTERN                                      │
└─────────────────────────────────────────────────────────────────┘
                                                            ⎩ 220

┌─────────────────────────────────────────────────────────────────┐
│ MONITOR VOLTAGES IN RESPONSE TO CURRENTS GENERATED              │
│ ACCORDING TO THE SELECTED CURRENT PATTERN                       │
└─────────────────────────────────────────────────────────────────┘
                                                            ⎩ 230

┌─────────────────────────────────────────────────────────────────┐
│ DETERMINE RESISTIVITY BASED ON THE MONITORED VOLTAGES           │
│ AND CURRENTS                                                    │
└─────────────────────────────────────────────────────────────────┘
                                                            ⎩ 240
```

Fig. 2

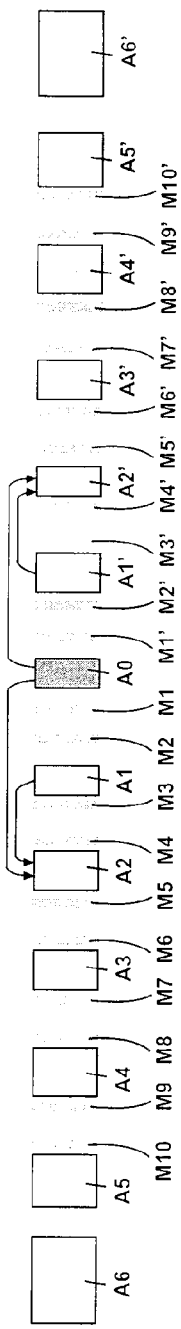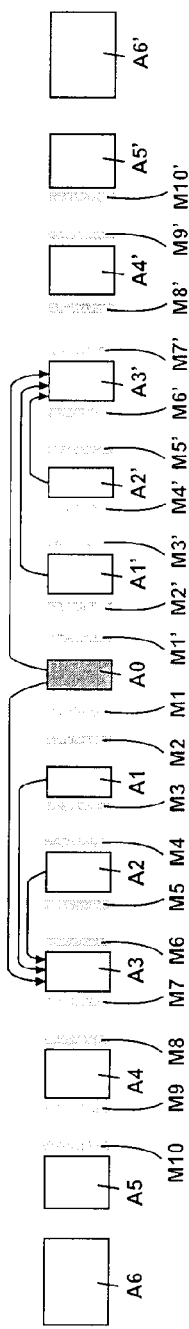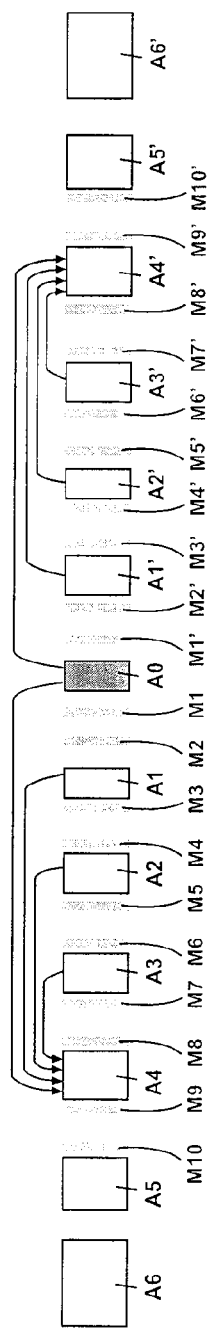

FOCUSED ARRAY LATEROLOG TOOL

PRIORITY APPLICATION

This application is a U.S. National Stage Filing under 35 U.S.C. 371 from International Application No. PCT/US2012/020082, filed on 3 Jan. 2013, and published as WO 2013103337 on 11 Jul. 2013; which application and publication is incorporated herein by reference in its entirety.

TECHNICAL FIELD

The present invention relates generally to apparatus for making measurements related to oil and gas exploration.

BACKGROUND

In drilling wells for oil and gas exploration, understanding the structure and properties of the associated geological formation provides information to aid such exploration. Measurements in a borehole are typically performed to attain this understanding. However, the environment in which the drilling tools operate is at significant distances below the surface and measurements to manage operation of such equipment are made at these locations.

Logging is the process of making measurements via sensors located downhole, which can provide valuable information regarding the formation characteristics. For example, induction logging utilizes electromagnetic signals that can be used to make deep measurements, which are substantially unaffected by the borehole and the effects of the zone invaded by the drilling. Since induction tools may not offer the most reliable measurements in a high resistivity formation, such as a formation having a resistivity greater than hundreds ohm-m, an array laterolog tool may offer more accurate measurements in the high resistivity cases. An array laterolog tool is a current based tool in which a current is generated from the tool and resistivity is determined from measured voltages based on Ohm's law. The array laterolog tool typically includes a central current electrode with additional current electrodes above and below the central current electrode, where the additional current electrodes are used to achieve focusing. Typically, the additional current electrodes can be arranged to force flow perpendicular to the axis of the logging device in a lateral direction. A resistivity log can be made with the tool in an uncased borehole filled with an electrically conductive material. Further, the usefulness of such measurements may be related to the precision or quality of the information derived from such measurements.

Widely used electrical well logging tools have azimuthal symmetrical structures, which may not offer the most accurate formation resistivity in deviated wells, especially in horizontal wells since boundaries and dipping angle can affect responses. Such tools also may not offer the most accurate measurement of the anisotropy of formation resistivity. To more accurately measure formation resistivity in anisotropic formation and deviated wells, tri-axial induction well logging tools have been developed during the past decade. Since induction tools may not offer reliable measurement in high resistivity formation, such as formation resistivity being greater than a hundred ohm-m, array laterolog tool may offer more accurate measurements in the high resistivity cases.

A conventional array laterolog can include a central electrode emitting current, with multiple guard electrodes above and below it such that current is sent between different guard electrodes to achieve greater or less focusing. The larger depth of investigation is provided with greater focusing. Hardware focusing may be further improved by focusing using data manipulation, in which the signals from the measurements are superimposed mathematically to ensure proper focusing in a wide range of conditions.

Some conventional array laterolog tools are operable to generate an average resistivity in deviated wells and horizontal wells. Typically, measurements from these commercial tools are applied to a two-dimensional model used in an inversion scheme to generate formation properties. These conventional tools may be referred to as two-dimensional (2D) tools. The measurements from these tools typically do reflect the formation resistivity when the tool is located in thin layers or is nearby a boundary in thick layers of wells. As a result, it is difficult for log analysts to compute accurate formation resistivity, dip angle in deviated wells, and distance to boundary in horizontal wells using the 2D tools.

BRIEF DESCRIPTION OF THE DRAWINGS

FIG. 2 shows features of an example method of determination of formation resistivity, in accordance with various embodiments.

FIG. 4 shows a current pattern of an example first mode, in accordance with various embodiments.

FIG. 5 shows a current pattern of an example second mode, in accordance with various embodiments.

FIG. 6 shows a current pattern of an example third mode, in accordance with various embodiments.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Improvements in array laterolog tools to consider the three-dimensional (3D) nature of the relationship between the well and the formation around the well can enhance the accuracy of resistivity measurements, which may in turn increase efficiencies in conducting drilling operations. In various embodiments, a tool is structured with components to function as an array laterolog such that operation of the tool can provide three-dimensional (3D) formation resistivity profiles in different radius, azimuthal angle, and depth. Such a tool may be referred to as a 3D array laterolog tool. In addition to being operable to providing 3D data, the 3D array laterolog tool can provide the same measurement as conventional array laterolog tools. The 3D array laterolog tool also can decrease the shoulder effect of measurements. With respect to an induction measurement, a shoulder effect is the influence on the induction measurement of a layer of interest by the adjacent layer above or below the layer being measured.

Figure 1:
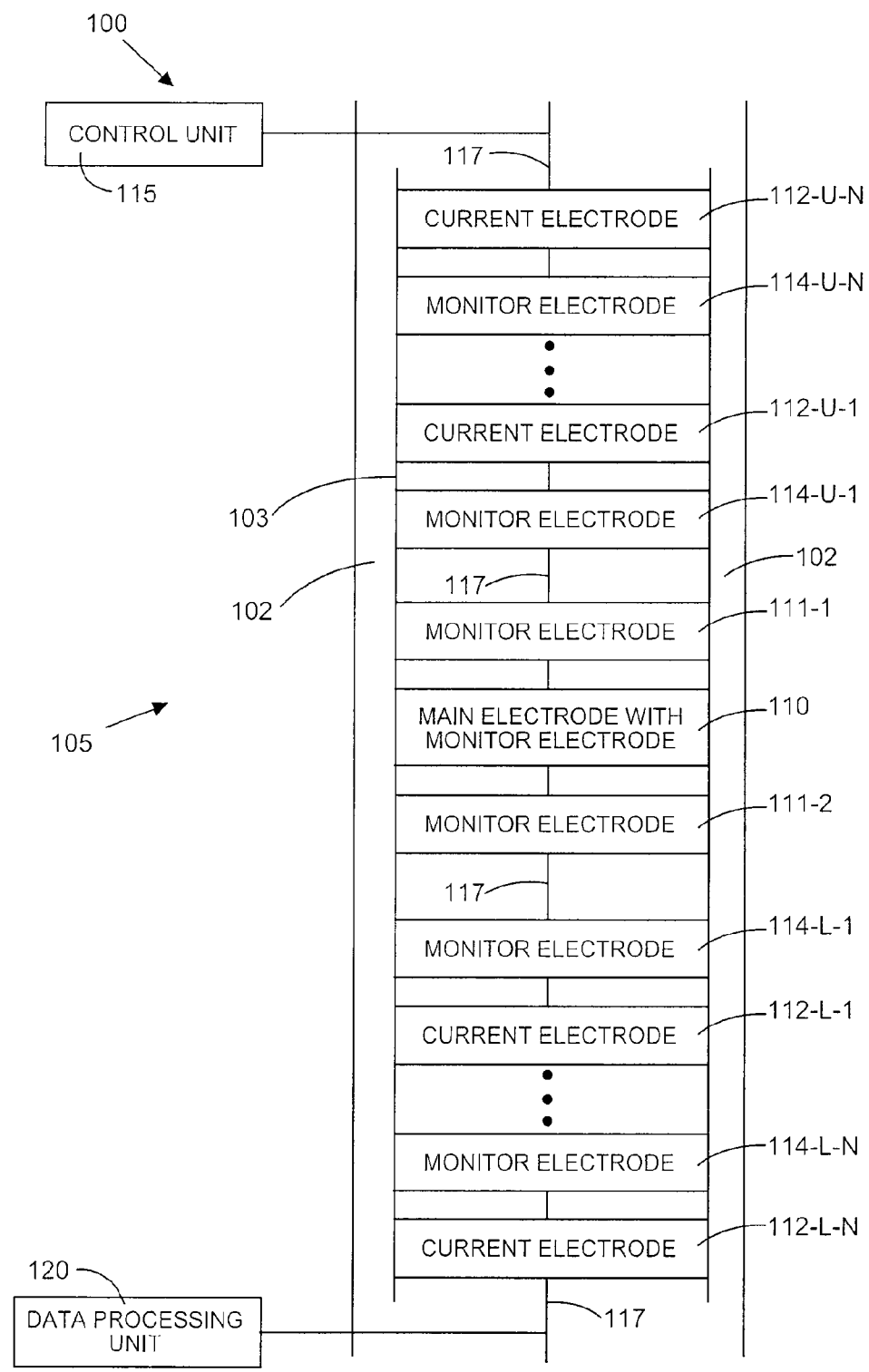
FIG. 1 shows a block diagram of an example system to determine formation resistivity, in accordance with various embodiments.

FIG. 1 shows a block diagram of an example embodiment of a system 100 structured to determine resistivity of a formation with respect to a drilling operation associated with borehole 102. The system 100 includes a tool 105 having a tool structure 103, a control unit 115, and a data processing unit 120. The tool structure 103 has a main electrode 110 having a number of azimuthal electrodes within the main electrode arranged with a monitor electrode, where the main electrode 110 can be operable with electrodes arranged on the tool structure 103 with respect to the main electrode 110 along a longitudinal axis 117 of the tool structure 103. Examples of azimuthal electrodes of the main electrode 110 can be realized as a number of spaced apart electrodes arranged azimuthally with respect to the axis 117 of the tool structure 103, as represented in non-limiting examples in FIGS. 3B, 10B, and 12. The spaced apart electrodes may be wrapped around the axis 117 of the tool 105. The number of spaced apart electrodes can equal two or more with the spaced apart electrodes wrapped around the axis of the tool.

The monitor electrodes 111-1 and 111-2 can be arranged on either side of and adjacent to the main electrode 110. The main electrode 110 can be arranged as a central electrode with an upper sequence of electrodes 112-U-1 . . . 112-U-N and monitor electrodes 114-U-1 . . . 114-U-N such that the upper sequence provides a first number of electrodes to one side of the main electrode 110 along the axis 117. The arrangement of main electrode 110 can also include a lower sequence of electrodes 112-L-1 . . . 112-L-N and monitor electrodes 114-L-1 . . . 114-L-N such that the lower sequence provides a second number of electrodes to the other side of the main electrode 10 along the axis 117. The upper sequence of the electrodes 112-U-1 . . . 112-U-N and the monitor electrodes 114-U-1 . . . 114-U-N can be arranged such that for each component of the upper sequence there is a component in the lower sequence arranged in substantially the same manner as the component in the upper sequence. In such an arrangement, the upper sequence of the electrodes 112-U-1 . . . 112-U-N and the monitor electrodes 114-U-1 . . . 114-U-N is considered to correspond to the lower sequence of the electrodes 112-L-1 . . . 112-L-N and the monitor electrodes 114-L-1 . . . 114-L-N. The corresponding electrodes of the upper and the lower sequences can be coupled together. This coupling can be realized as a direct connection or using switches. The electrodes 112-U-1 . . . 112-U-N and 112-L-1 . . . 12-L-N can be structured as current electrodes. The number of monitor electrodes can be arranged such that voltages are controlled with respect to current generated from the spaced apart electrodes of the main electrode. Although not shown, more than one monitor electrode may be associated with a given current electrode.

The control unit 115 can be structured to operably manage generation and control of a current signal from the azimuthal electrodes of the main electrode 110 and generation and control of current from the electrodes 112-U-1 . . . 112-U-N and 112-L-1 . . . 112-L-N. The control unit 115 can be structured to operably manage measurement of voltages and/or setting voltages of the monitor electrodes 114-U-1 . . . 114-U-N and 114-L-1 . . . 114-L-N. The control unit 115 can be structured to selectively generate current from the main electrode 110 and the electrodes 112-U-1 . . . 112-U-N and 112-L-1 . . . 112-L-N according to a selected pattern. The control unit 115 can be structured to selectively generate current and/or set reference potentials such that measured voltages and generated currents can be used to determine resistivity taking into account azimuthal considerations to provide a three-dimensional tool.

The data processing unit 120 of the system 100 can be structured to process the measured voltages with respect to the generated currents to determine formation resistivity. The data processing unit 120 can be realized as a processing unit with a controller, such as a processor, with a data storage device such that values of measured voltages and generated currents can be processed to provide resistivity associated with an azimuth. The tool 105 can be structured with the data processing unit 120 and the control unit 115 both integrated with the tool structure 103 or structured as distributed components.

The control unit 115 can be structured to selectively control the first number of the electrodes 112-U-1 . . . 112-U-N and the second number of the electrodes 112-L-1 . . . 112-L-N such that selected ones of the first number of electrodes and of the second number of electrodes receive current from the spaced apart electrodes of the main electrode 110. The control unit 115 can be arranged to generate current from other selected ones of the first number of electrodes and the second number of electrodes based on a selected current pattern. The control unit 115 can be arranged to adjust the current such that a potential difference between selected ones of the monitored electrodes equals a reference potential.

The control unit 115 can be arranged to selectively control the main electrode 110, the first number of electrodes 112-U-1 . . . 112-U-N, and the second number of electrodes 112-L-1 . . . 112-L-N to generate a current pattern, k, such that a monitor electrode, M0, for the main electrode 110 has a reference potential, $VM0_k$, for each current pattern k, $VM0_k$ given by $$VM0_k = \frac{\sum_{i=1}^{N} VM0(k,i)}{N},$$

where N equals the number of spaced apart electrodes of the main electrode 110 and VM0(k,i) is the potential at M0 for the current pattern k for spaced apart electrode i, i=1, ..., N. The data processing unit 120 can be arranged to process measured voltages to generate a resistivity, R(k,i) for the current pattern k for the $i^{th}$ spaced apart electrode, R(k,i) given by $$R(k,i) = Kk \frac{\sum_{j=1}^{N} VM1(k,j) * C(k,j)}{N * IA0(k,i)}$$

$$(i = 1, \ldots, N),$$

where VM1(k,j) is a potential at monitor electrode M1 adjacent to the main electrode 110 for the current pattern k for the $j^{th}$ spaced apart electrode in the summation, Kk is a tool coefficient for current pattern k, C(k,j) is a coefficient of spaced apart electrode j for current pattern k, C(k,j) given by $$C(k,j) = \frac{VM0_k}{VM0(k,j)} \quad (j=1,\ldots,N),$$

and IA0(k,i) is the current from the $i^{th}$ spaced apart electrode of the main electrode, A0, for the $k^{th}$ current pattern, IA0(k,i) given by $$IA0(k,i) = C(k,i)*I0, (i=1,\ldots,N),$$

I0 being a reference current.

FIG. 2 shows features of an embodiment of a method of determining formation resistivity. At 210, current is generated from each electrode of a number of spaced apart electrodes within a main electrode of a tool disposed in a borehole, where the spaced apart electrodes are arranged azimuthally with respect to an axis of the tool. The spaced apart electrodes can also be arranged with respect to a main monitor electrode for the main electrode. These spaced apart electrodes arranged azimuthally may be referred to as azimuthal electrodes.

At 220, current from each of a first number of electrodes to one side of the main electrode along the axis is controlled and current from each of a second number of electrodes on another side of the main electrode along the axis is controlled, where the current is controlled according to a selected current pattern. Control of current can include generating current from elected electrodes while maintaining other electrodes in a non-current condition such that current does not flow to or from these other electrodes. The first number of electrodes and the second number of electrodes may be arranged symmetrically with respect to the main electrode. The current from electrodes of the first number of electrodes and current from electrodes of the second number of electrodes can be generated using one or more current generators such that the current can be selectively generated from electrodes of the first number and second number of electrodes. The first number of electrodes and the second number of electrodes can be arranged such that each electrode of the first number of electrodes and is operatively coupled to the corresponding electrode of the second number of electrodes. This coupling can be realized as a direct connection or using switches.

At 230, voltages are monitored in response to currents generated according to the selected current pattern. These voltages can be monitored at monitor electrodes. In addition, focusing of current flow, such as in current patterns among the electrodes, can be conducted by setting chosen ones of sets of monitor electrodes to selected voltages. Monitor electrodes can be arranged such that monitor electrodes associated with the first number of electrodes have corresponding monitor electrodes associated with the second number of electrodes. Monitor electrodes associated with the first number of electrodes may be operatively coupled to the corresponding monitor electrodes associated with the second number of electrodes. This coupling can be realized as a direct connection or using switches.

At 240, resistivity is determined based on the monitored voltages and currents. Values from measured voltages and currents can be collected and stored in a memory device or devices. A controller, such as a processor, or other logic devices can be used to operate on the stored data to determine formation resistivity. The results of resistivity determination may be used in conducting drilling operations. The drilling operations can include, but is not limited to, steering a drilling operation to a region or away from a region. Electronics implemented to process the data may be part of a system that conducts drilling operations in autonomous or semi-autonomous manner.

Operation of the tool can include adjusting potentials on monitor electrodes such that the monitor electrode of the main electrode has a reference potential for all spaced apart electrodes arranged azimuthally in the main electrode. Operation can include setting the reference potential of the main monitor electrode, M0, for the main electrode according to a current pattern, k, generated by controlling the potentials and currents such that the reference potential, $VM0_k$ for each current pattern k, is given by $$VM0_k = \frac{\sum_{i=1}^{N} VM0(k,i)}{N},$$

where N equals the number of spaced apart electrodes of the main electrode and VM0(k,i) is the potential at M0 for the current pattern k for spaced apart electrode i, i=1, ..., N. Operation of the tool can include determining resistivity using measured voltages to generate resistivity, R(k,i) for the current pattern k for the $i^{th}$ spaced apart electrode, R(k,i) given by $$R(k,i) = Kk \frac{\sum_{j=1}^{N} VM1(k,j) * C(k,j)}{N * IA0(k,i)}$$

$$(i = 1, \ldots, N),$$

where VM1(k,j) is a potential at a monitor electrode M1 for the current pattern k for the $j^{th}$ spaced apart electrode in the summation, Kk is a tool coefficient for current pattern k, C(k,j) is a coefficient of spaced apart electrode j for current pattern k, C(k,j) given by $$C(k, j) = \frac{VM0_k}{VM0(k, j)} (j = 1, \ldots, N),$$

and $IA0(k,i)$ is the current from the $i^{th}$ spaced apart electrode of the main electrode, A0, for the $k^{th}$ current pattern, $IA0(k,i)$ given by $$IA0(k,i)=C(k,i)*I0, (i=1,\ldots,N),$$

I0 being a reference current. The reference current can be realized as the current generated by the tool to be sent from each of the spaced apart electrodes. At a reference potential for all azimuthal electrodes, the current from each azimuthal electrode may be I0 with the tool in a homogenous medium. The current from each azimuthal electrode may vary in an unhomogenous medium.

Generating current and controlling current in a resistivity measurement can include generating a first selected current pattern with the first number of electrodes disposed in a first sequence from the main electrode and with the second number of electrodes disposed in a second sequence arranged in substantially the same manner as the first number of electrodes in the first sequence. The generating of the current pattern can include generating the current from each azimuthal electrode of the main electrode to a second electrode in the first sequence and to a corresponding second electrode in the second sequence, based on a reference current; and controlling current from a first electrode in the first sequence to the second electrode in the first sequence and controlling current from a first electrode in the second sequence to the second electrode in the second sequence such that remaining electrodes in the first sequence and in the second sequence do not emit current.

Generating current and controlling current in a resistivity measurement can include generating a second selected current pattern with the first number of electrodes disposed in a first sequence from the main electrode and with the second number of electrodes disposed in a second sequence from the main electrode. The generating of the current pattern can include generating the current from each azimuthal electrode of the main electrode, based on a reference current, to a third electrode in the first sequence and to a corresponding third electrode in the second sequence, and controlling current from a first electrode in the first sequence to the third electrode in the first sequence, controlling current from a second electrode in the first sequence to the third electrode in the first sequence, controlling current from a first electrode in the second sequence to a third electrode in the second sequence, and controlling current from a second electrode in the second sequence to the third electrode in the second sequence such that remaining electrodes in the first sequence and in the second sequence do not emit current.

Generating current and controlling current in a resistivity measurement can include generating a third selected current pattern with the first number of electrodes disposed in a first sequence from the main electrode and with the second number of electrodes disposed in a second sequence from the main electrode. The generating of the current pattern can include generating the current from each azimuthal electrode of the main electrode, based on a reference current, to a fourth electrode in the first sequence and to a corresponding fourth electrode in the second sequence; and controlling current from a first electrode in the first sequence to the fourth electrode in the first sequence, controlling current from a second electrode in the first sequence to the fourth electrode in the first sequence, controlling current from a third electrode in the first sequence to the fourth electrode in the first sequence, controlling current from a first electrode in the second sequence to a fourth electrode in the second sequence, controlling current from a second electrode in the second sequence to the fourth electrode in the second sequence, and controlling current from a third electrode in the second sequence to the fourth electrode in the second sequence such that remaining electrodes in the first sequence and in the second sequence do not emit current.

Generating current and controlling current in a resistivity measurement can include generating a fourth selected current pattern with the first number of electrodes disposed in a first sequence from the main electrode and with the second number of electrodes disposed in a second sequence from the main electrode. The generating of the current pattern can include generating the current from each azimuthal electrode of the main electrode, based on a reference current, to a fifth electrode in the first sequence and to a corresponding fifth electrode in the second sequence; and controlling current from a first electrode in the first sequence to the fifth electrode in the first sequence, controlling current from a second electrode in the first sequence to the fifth electrode in the first sequence, controlling current from a third electrode in the first sequence to the fifth electrode in the first sequence, controlling current from a fourth electrode in the first sequence to the fifth electrode in the first sequence, controlling current from a first electrode in the second sequence to a fifth electrode in the second sequence, controlling current from a second electrode in the second sequence to the fifth electrode in the second sequence, controlling current from a third electrode in the second sequence to the fifth electrode in the second sequence, and controlling current from a fourth electrode in the second sequence to the fifth electrode in the second sequence such that remaining electrodes in the first sequence and in the second sequence do not emit current.

Generating current and controlling current in a resistivity measurement can include generating a fifth selected current pattern with the first number of electrodes disposed in a first sequence from the main electrode and with the second number of electrodes disposed in a second sequence from the main electrode. The generating of the current pattern can include generating the current from each azimuthal electrode of the main electrode, based on a reference current, to a sixth electrode in the first sequence and to a corresponding sixth electrode in the second sequence; and controlling current from a first electrode in the first sequence to the sixth electrode in the first sequence, controlling current from a second electrode in the first sequence to the sixth electrode in the first sequence, controlling current from a third electrode in the first sequence to the sixth electrode in the first sequence, controlling current from a fourth electrode in the first sequence to the sixth electrode in the first sequence, controlling current from a fifth electrode in the first sequence to the sixth electrode in the first sequence, controlling current from a first electrode in the second sequence to a sixth electrode in the second sequence, controlling current from a second electrode in the second sequence to the sixth electrode in the second sequence, controlling current from a third electrode in the second sequence to the sixth electrode in the second sequence, controlling current from a fourth electrode in the second sequence to the sixth electrode in the second sequence, and controlling current from a fifth electrode in the second sequence to the sixth electrode in the second sequence such that remaining electrodes in the first sequence and in the second sequence do not emit current.

Figure 3A:
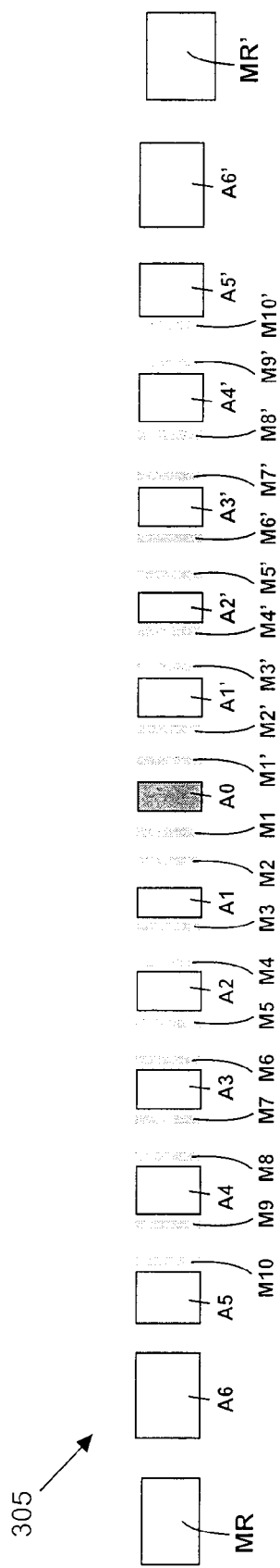
FIGS. 3A and 3B show an example tool configuration of a three-dimensional array laterolog, in accordance with various embodiments.
Figure 3B:
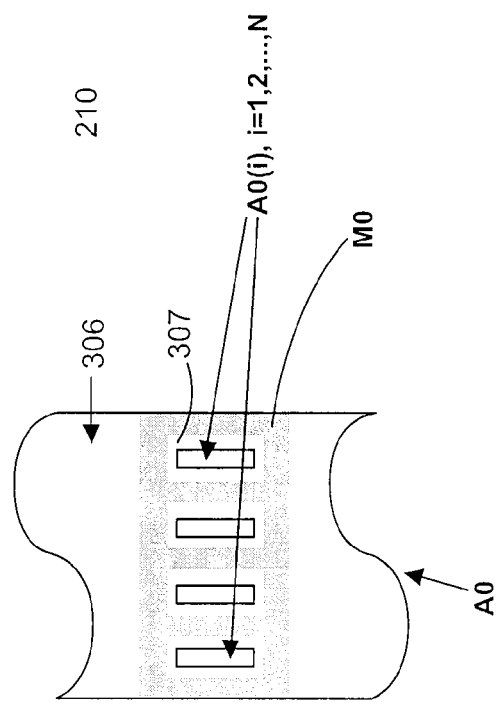

FIGS. 3A and 3B show an example of an embodiment of a tool configuration of a 3D array laterolog. Tool 305 includes a main electrode A0, monitor electrodes M1, M2, M3, M4, M5, M6, M7, M8, M9, M10, and bucking electrodes A1, A2, A3, A4, A5, and A6. Electrode MR can be used as a reference electrode such that the potentials at monitor electrodes M1, M2, M3, M4, M5, M6, M7, M8, M9, and M10 may be measured with respect to the electrode MR. The tool 305 also includes monitor electrodes M1', M2', M3', M4', M5', M6', M7', M8'. M9', M10' on the opposite side of the main electrode A0 and opposite side bucking electrodes A1', A2', A3', A4', A5', and A6'. Electrode MR' can be used as a reference electrode such that the potentials at the monitor electrodes M1', M2', M3', M4', M5', M6', M7', M8', M9', and M10' may be measured with respect to the electrode MR'. The monitor electrodes Mi and Mi', i=1, . . . , 10, can be connected together for each i, and the bucking electrodes Aj and Aj', j=1, . . . , 6, can be connected together for each j. The tool 305 is not limited to six bucking electrodes and six corresponding bucking electrodes. The number of bucking electrodes can be structured with less than or more than 6 bucking electrodes and 6 corresponding bucking electrodes. The tool 305 is also not limited to ten monitor electrodes and ten corresponding monitor electrodes. The number of monitor electrodes can be structured with less than or more than 10 monitor electrodes and 10 corresponding monitor electrodes.

FIG. 3B shows an example of an embodiment of a structure of a main electrode A0. The main electrode A0 can include N azimuthal electrodes, A0(i), i=1, . . . , N, fixed on a monitor electrode M0. The monitor electrode M0 can be disposed on an insulator 306. Each azimuthal electrode A0(i) can separated from the monitor electrode M0 and from each other by an insulator 307. The insulator 306 and the insulator 307 can be composed of the same material. Alternatively, the insulator 306 and the insulator 307 can be composed of different materials. The tool 305 can operate with respect to the main electrode A0 by a number of different procedures, where each procedure can be referenced herein as an operation mode. These operation modes can correspond to current patterns with current generated from the main electrode A0 and passing through selected ones of the electrodes A1, A2, A3, A4, A5, A6, A1', A2', A3', A4', A5', and A6' of the tool 305. For example, the tool 305 can have five operation modes with different investigations with respect to radial direction and the same vertical resolution, and N azimuthal measurements, where N corresponds to the number of azimuthal electrodes A0(i) of the main electrode A0. In an embodiment, N can be set at 8, however the main electrode A0 can be structured with N set to less than or more than 8.

FIG. 4 shows an example of a current pattern of an embodiment of a mode. This mode can be referred to as Mode 1. Each azimuthal electrode A0(i) of the main electrode A0 is controlled to emit current. The current provided to each azimuthal electrode for emission can be a fixed or reference current I0. In a homogeneous medium, each azimuthal A0(i) electrode emitting current I0 can generate the same potential on the monitor electrode M0 for all A0(i). In unhomogeneous medium, different A0(i) will produce different potential on M0 if all A0(i) emit the same current I0. A reference potential can be determined for all azimuthal electrodes such that each A0(i) can emit a current to produce the reference potential on the monitor electrode. With the potential on the monitor electrode set to the reference potential, the current emitted by A0(i) can be altered from I0 to an equivalent current that equals I0 multiplied by a coefficient, which may be referred to as C(l,i) for azimuthal electrode A0(i) in the Mode 1.

The focusing electrodes A1 and A1', which are connected, emit a focusing current I1. The currents I0 and I1 can be selected such that the difference of voltage between the monitor electrodes M1 and M2 can be set to a reference. This reference can be zero. With the voltage between M1 and M2 set to zero, for example, potentials of the monitor electrodes M1 and M0, where M0 is shown in FIG. 3B, can be measured to provide potentials VM1(1,i) and VM0(1,i) for each azimuthal electrode A0(i) of the main electrode A0, i=1, . . . , N, where (1, i) refers to the Mode 1 with electrode index i. A reference potential of M0 can be selected. For example, the reference potential of M0 can be selected as an average potential of the azimuthal electrodes of the main electrode A0, given by $$VM0_{avr1} = \frac{\sum_{i=1}^{N} VM0(1, i)}{N},$$

A coefficient for each azimuthal electrode measurement can be computed as $$C(1, i) = \frac{VM0_{avr1}}{VM0(1, i)} (i = 1, \dots, N)$$

If the potential of the monitor electrode M0 is keep constant, such as at $VM0_{avr1}$, the current emitted by each electrode A0(i) of main electrode A0 is $$IA0(1,i) = C(1,i) * I0, (i=1, \dots, N)$$

The azimuthal resistivity for Mode 1 can be computed by $$Ra(1, i) = K1 \frac{\sum_{j=1}^{N} VM1(1, j) * C(1, j)}{N * IA0(1, i)}, (i = 1, \dots, N)$$

where K1 is the tool's coefficient of Mode 1. K1 can be determined by a calibration procedure. The average apparent resistivity, corresponding to conventional measurements, can be computed by $$Ra1 = K1 \frac{\sum_{j=1}^{N} VM1(1, j) * C(1, j)}{\sum_{j=1}^{N} IA0(1, j)}.$$

FIG. 5 shows an example of a current pattern of an embodiment of a second mode, referred to as Mode 2. The current I0 and I1 mentioned in Mode 1 can be generated to flow to the electrode A3, and the bucking electrode A2 can also be controlled to emit a current I2 that flows to the electrode A3. Currents I1 and I2 can be adjusted to set the difference of potential between M1 and M2 and the difference of potential between M3 and M4 to a reference, such as zero. With these potential differences set, the potentials of the monitor electrodes M1 and M0 can be measured as VM1(2,i) and VM0(2, i)(i=1, . . . , N), where (2, i) refers to Mode 2 with electrode index i. The average potential of the monitor electrode M0 is $$VM0_{avr2} = \frac{\sum_{i=1}^{N} VM0(2,i)}{N}.$$

The coefficient of each azimuthal electrode is $$C(2,i) = \frac{VM0_{avr2}}{VM0(2,i)}, (i = 1, \ldots, N).$$

Keeping the potential of monitor electrode at M0 at $VM0_{avr2}$, the current emitted by A0(i) is $$IA0(2,i) = C(2,i)*I0, (i=1,\ldots,N).$$

The azimuthal resistivity can be computed by $$Ra(2,i) = K2 \frac{\sum_{j=1}^{N} VM1(2,j)*C(2,j)}{N*IA0(2,i)}, (i = 1, \ldots, N),$$

where K2 is the tool's coefficient of Mode 2. K2 can be determined by a calibration procedure. The average apparent resistivity, corresponding to conventional measurements, can be computed by $$Ra2 = K2 \frac{\sum_{j=1}^{N} VM1(2,j)*C(2,j)}{\sum_{j=1}^{N} IA0(2,j)}.$$

FIG. 6 shows an example of a current pattern of an embodiment of a third mode, referred to as Mode 3. The currents I0, I1, and I2 can be generated to flow to the electrode A4 and the electrode A3 can also be controlled to emit current I3 to flow to the electrode A4. Currents I1, I2, and I3 can be adjusted to set the difference of potential between M1 and M2, the difference of potential between M3 and M4, and the difference of potential between M5 and M6 to a reference, such as zero. With these potential differences set, the potentials of the monitor electrodes M1 and M0 can be measured as VM1(3,i) and VM0(3,i)(i=1, . . . , N), where (3, i) refers to Mode 3 with electrode index i. The average potential of the monitor electrode M0 is $$VM0_{avr3} = \frac{\sum_{i=1}^{N} VM0(3,i)}{N}.$$

The coefficient of each azimuthal electrode is $$C(3,i) = \frac{VM0_{avr3}}{VM0(3,i)}, (i = 1, \ldots, N).$$

Keeping the potential of the monitor electrode M0 at $VM0_{avr3}$, the current emitted by A0(i) is $$IA0(3,i) = C(3,i)*I0, (i=1,\ldots,N).$$

The azimuthal resistivity can be computed by $$Ra(3,i) = K3 \frac{\sum_{j=1}^{N} VM1(3,j)*C(3,j)}{N*IA0(3,i)}, (i = 1, \ldots, N),$$

where K3 is the tool's coefficient of Mode 3. K3 can be determined by a calibration procedure. The average apparent resistivity, corresponding to conventional measurements, can be computed by $$Ra3 = K3 \frac{\sum_{j=1}^{N} VM1(3,j)*C(3,j)}{\sum_{j=1}^{N} IA0(3,j)}.$$

Figure 7:
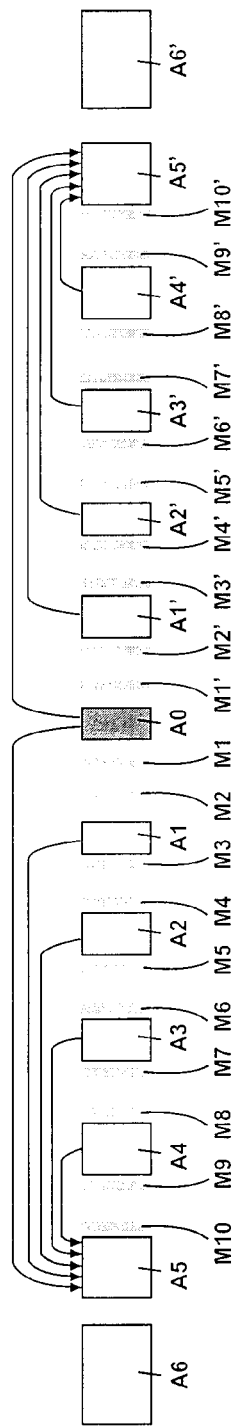
FIG. 7 shows a current pattern of an example fourth mode, in accordance with various embodiments.

FIG. 7 shows an example of a current pattern of an embodiment of a fourth mode, referred to as Mode 4. The currents I0, I1, I2, and I3 can be generated to flow to the electrode A5. The electrode A4 can also be controlled to emit current I4 to flow to the electrode A5. Currents I1, I2, I3, and I4 can be adjusted to set the difference of potential between M1 and M2, the difference of potential between M3 and M4, the difference of potential between M5 and M6, and the difference of potential between M7 and M8 to a reference, such as zero. With these potential differences set, the potentials of the monitor electrodes M1 and M0 can be measured as VM1(4,i) and VM0(4,i)(i=1, . . . , N), where (4, i) refers to Mode 4 with electrode index i. The average potential of the monitor electrode M0 is $$VM0_{avr4} = \frac{\sum_{i=1}^{N} VM0(4,i)}{N}.$$

The coefficient of each azimuthal electrode is $$C(4,i) = \frac{VM0_{avr4}}{VM0(4,i)}, (i = 1, \ldots, N).$$

Keeping the potential of the monitor electrode M0 at $VM0_{avr4}$, the current emitted by A0(i) is $$IA0(4,i) = C(4,i)*I0, (i=1,\ldots,N).$$

The azimuthal resistivity can be computed by $$Ra(4,i) = K4 \frac{\sum_{j=1}^{N} VM1(4,j)*C(4,j)}{N*IA0(4,i)},$$

$$(i = 1, \ldots, N)$$

where K4 is the tool's coefficient of Mode 4. K4 can be determined by a calibration procedure. The average apparent resistivity, corresponding to conventional measurements, can be computed by $$Ra4 = K4 \frac{\sum_{j=1}^{N} VM1(4, j) * C(4, j)}{\sum_{j=1}^{N} IA0(4, j)}.$$

Figure 8:
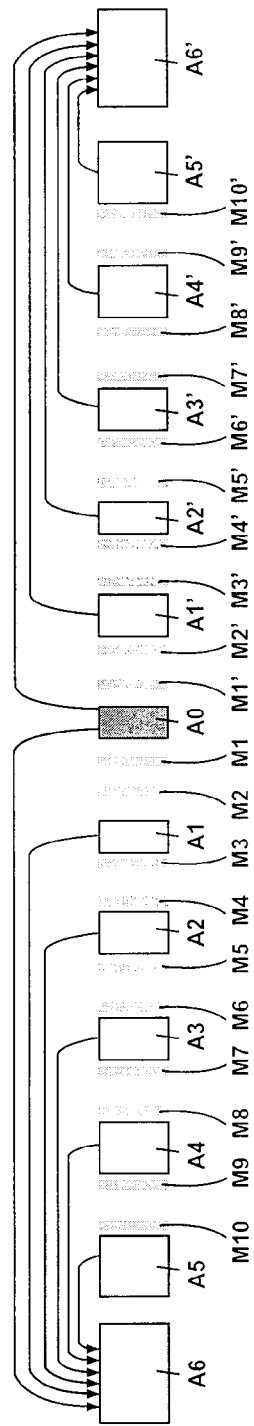
FIG. 8 shows a current pattern of an example fifth mode, in accordance with various embodiments.

FIG. 8 shows an example of a current pattern of an embodiment of a fifth mode, referred to as Mode 5. The currents I0, I1, I2, I3, I4 and I5 can be generated to flow to the electrode A6. The electrode A5 can also be controlled to emit current I5 to flow to the electrode A6. Currents I1, I2, I3, I4, and I5 can be adjusted to set the difference of potential between M1 and M2, the difference of potential between M3 and M4, the difference of potential between M5 and M6, the difference of potential between M7 and M8, and the difference of potential between M7 and M8 to a reference, such as zero. With these potential differences set, the potentials of the monitor electrodes M1 and M0 can be measured as VM1(5,i) and VM0(5, i)(i=1, . . . , N), where (5, i) refers to Mode 5 with electrode index i. The average potential of the monitor electrode M0 is $$VM0_{avr5} = \frac{\sum_{i=1}^{N} VM0(5, i)}{N}.$$

The coefficient of each azimuthal electrode is $$C(5, i) = \frac{VM0_{avr5}}{VM0(5, i)},$$
$$(i = 1, \ldots, N).$$

Keeping the potential of the monitor electrode M0 at $VM0_{avr5}$, the current emitted by A0(i) is $$IA0(5,i)=C(5,i)*I0, (i=1,\ldots,N).$$

The azimuthal resistivity can be computed by $$Ra(5, i) = K5 \frac{\sum_{j=1}^{N} VM1(5, j) * C(5, j)}{N * IA0(5, i)},$$
$$(i = 1, \ldots, N),$$

where K5 is the tool's coefficient of Mode 5. K5 can be determined by a calibration procedure. The average apparent resistivity, corresponding to conventional measurements, can be computed by $$Ra5 = K5 \frac{\sum_{j=1}^{N} VM1(5, j) * C(5, j)}{\sum_{j=1}^{N} IA0(5, j)}.$$

Figure 9:
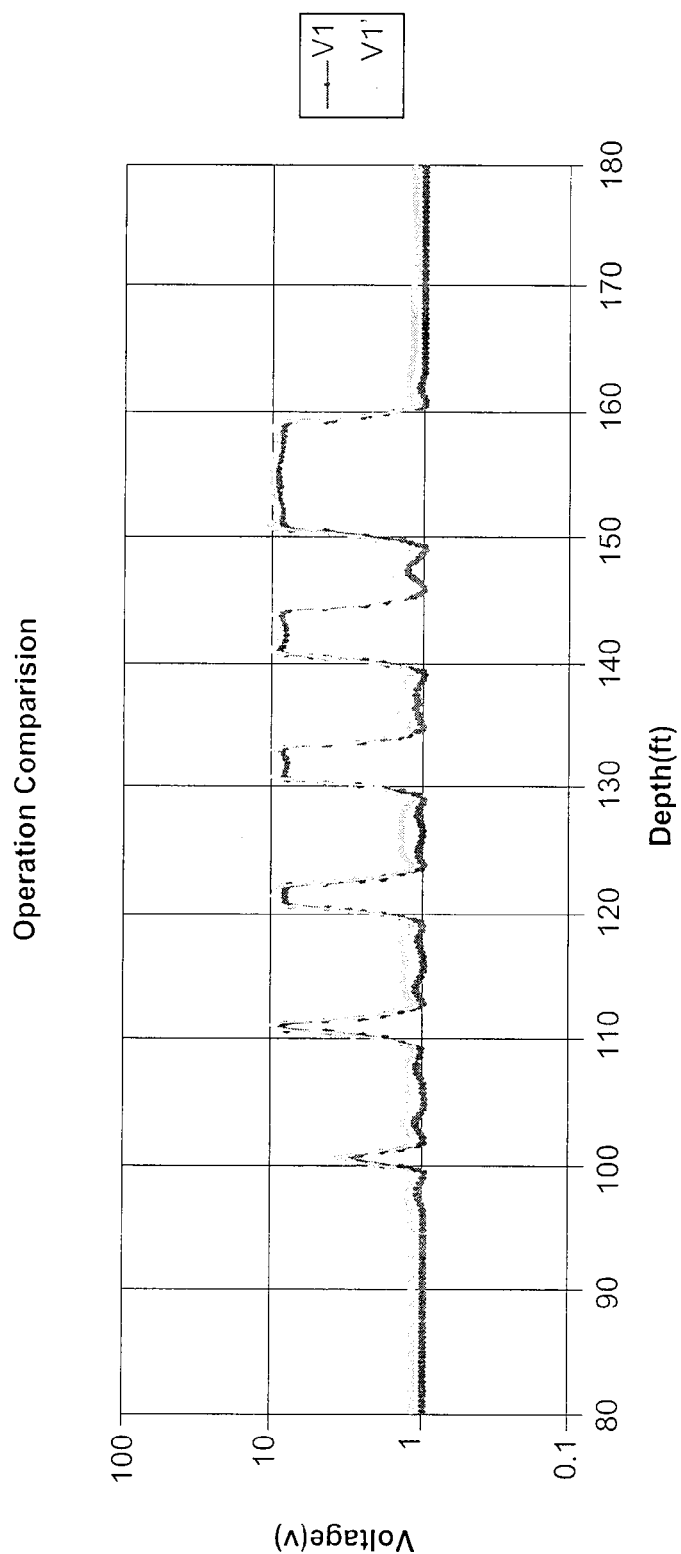
FIG. 9 shows a shoulder effect comparison between an operation mode and a conventional approach, in accordance with various embodiments.

FIG. 9 shows a shoulder effect comparison between an operation mode and a conventional approach in a simulation. Mode 1 is used as an example to demonstrate that operation of an embodiment of a 3D array laterolog tool has less shoulder effect than a traditional array laterolog tool. FIG. 9 shows the potential on monitor electrode M1 in an example 2D chirp formation with low resistivity, 1 ohm-m, and high resistivity, 10 ohm-m. In this example, thickness of high resistivity layers range from 1 ft to 10 ft and are separated by 9 ft, 8 ft, 7 ft, 6 ft, and 5 ft from left to right side, respectively. Curve V represents the potential computed with an embodiment of operation Mode 1, and V1' is the potential computed with a traditional operation method. FIG. 9 shows the operation of Mode 1 has less shoulder effects.

Figure 10A:
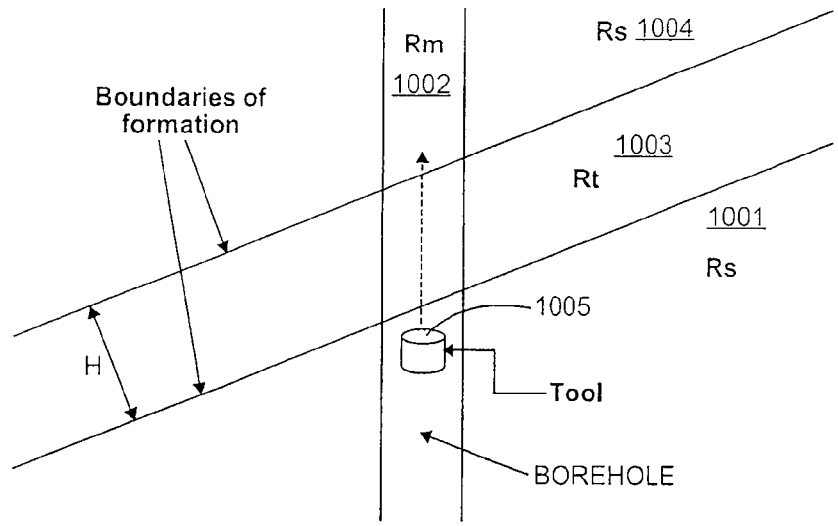
FIGS. 10A and 10B illustrate a three-dimensional formation model with borehole and tilt formation, in accordance with various embodiments.
Figure 10B:
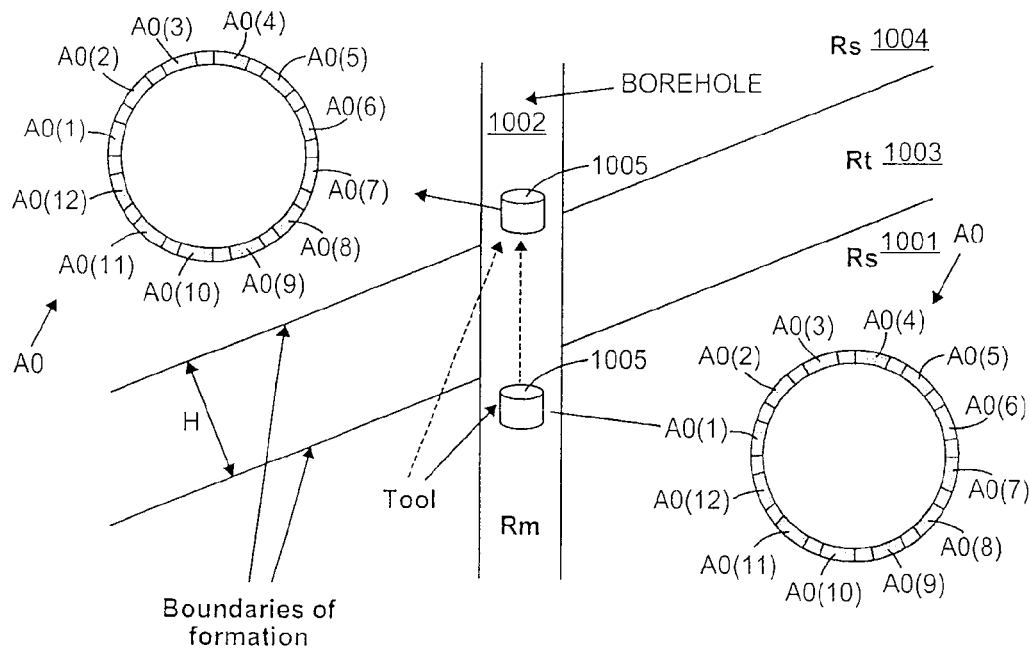

In a simulated example, responses of a tool having a main electrode with 12 azimuthal electrodes were simulated in a tilt formation model and horizontal well model. These responses provided a verification of the detection ability of embodiments of a 3D focused array laterolog tool in three-dimensional formations with respect to a three-dimensional formation resistivity profile. FIGS. 10A and 10B illustrate a three-dimensional formation model with a borehole 1002 having resistivity Rm and with a tilt formation such that a layer 1003 having resistivity Rt and thickness H between boundaries of the formation in which Rt resistivity layer separates layers 1001 and 1004 having resistivity Rs. FIG. 10A shows the formation model and FIG. 10B shows an aerial view of the azimuthal electrodes A0(1)-A0(12) of main electrode A0 of tool 1005, where the azimuthal electrodes A0(1)-A0(12) are arranged as spaced apart electrodes wrapped around the axis of tool 1005. Monitor electrodes and bucking electrodes, though not shown, are along a longitudinal axis of tool 1005, which can be similar to an arrangement as shown in FIG. 1. When tool 1005 is below the tilted layer 1003, azimuthal electrodes A0(2) and A0(3) face the layer 1003 and azimuthal electrodes A0(8) and A0(9) that are opposite to electrodes A0(2) and A0(3) can be said to be opposite the layer 1003. When tool 1005 moves up to the top of the layer 1003, the relative position of these four azimuthal electrodes to the layer 1003 have changed relative to each other.

Figure 11A:
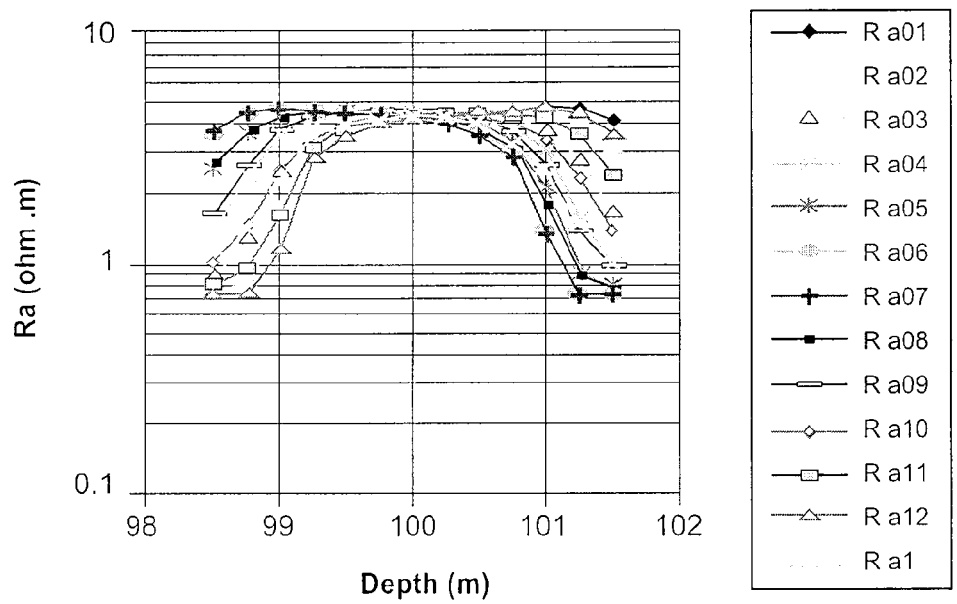
FIGS. 11A-11E show simulated data of five modes using a three-dimensional array laterolog tool in a three-dimensional formation model, in accordance with various embodiments.
Figure 11B:
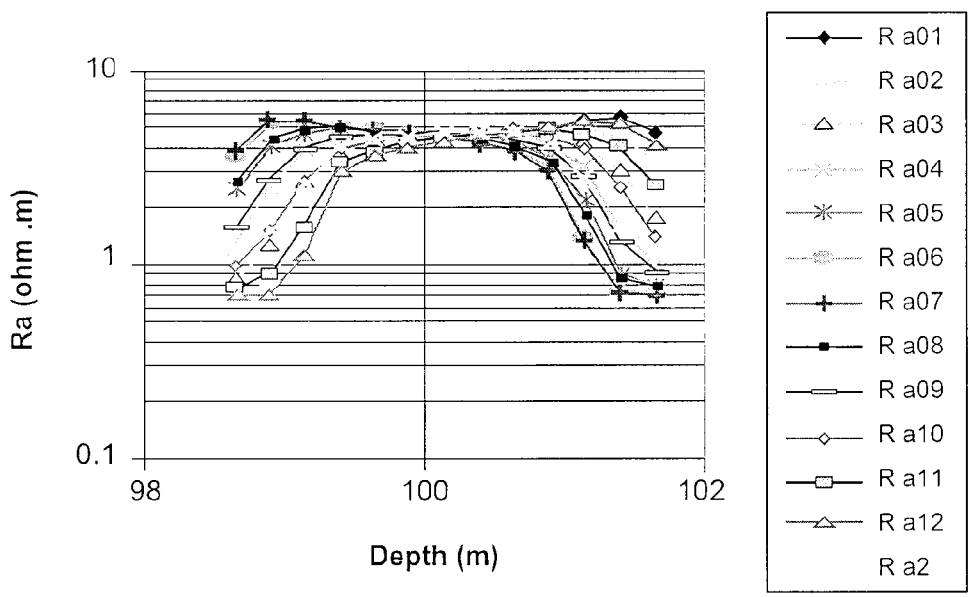
Figure 11C:
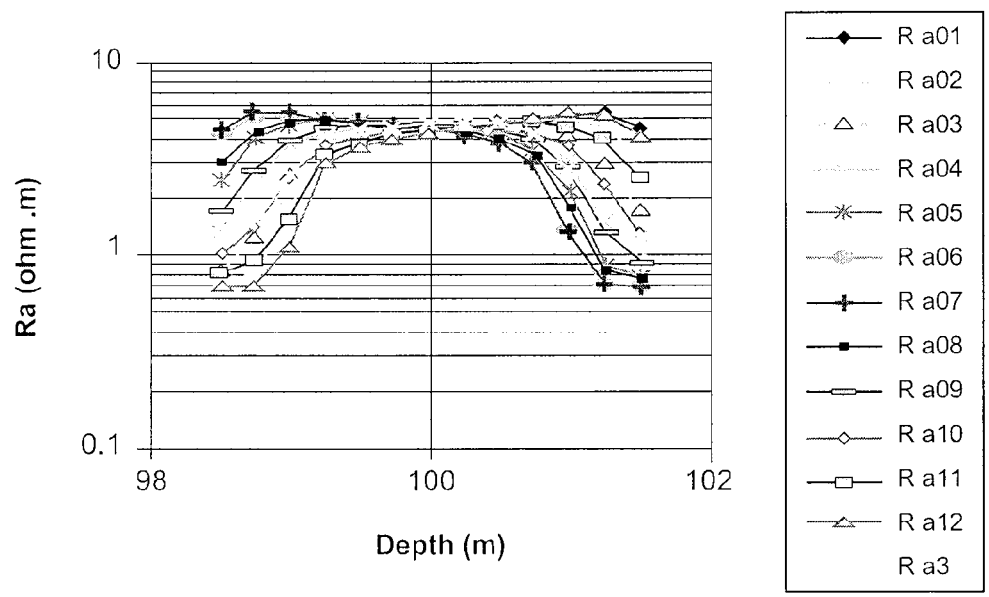
Figure 11D:
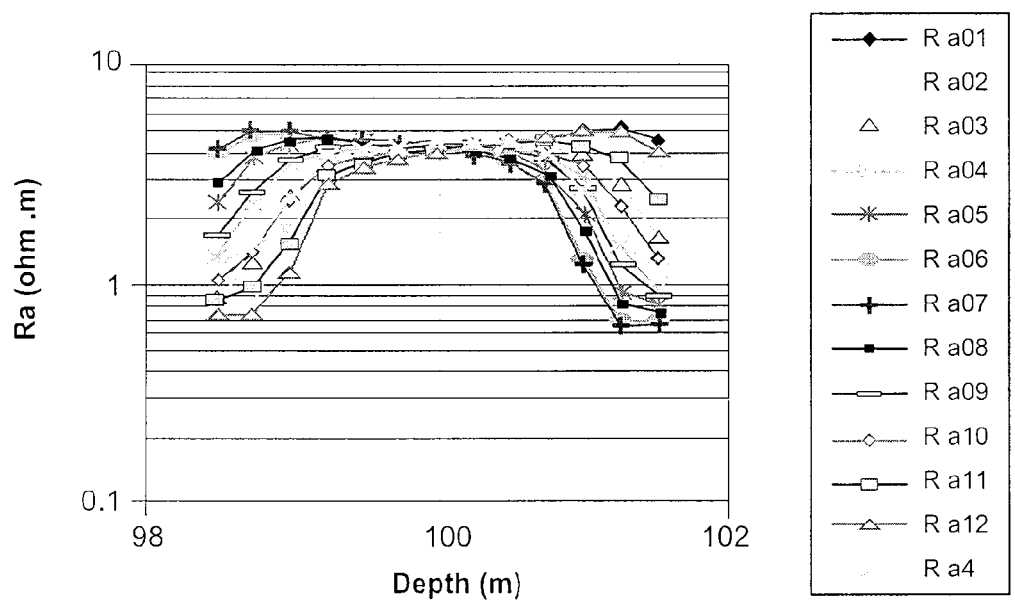
Figure 11E:
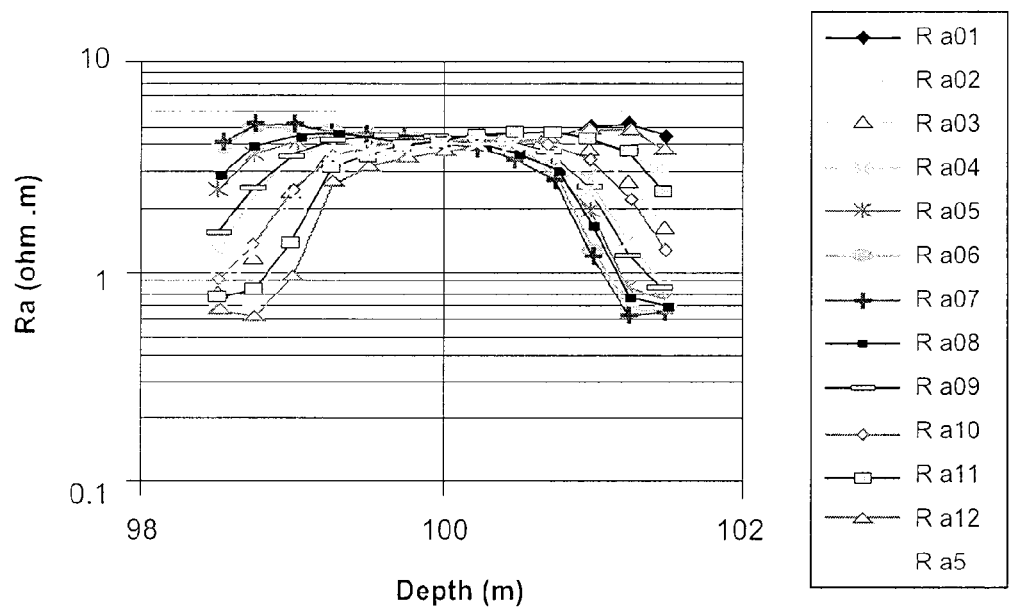
Figure 11F:
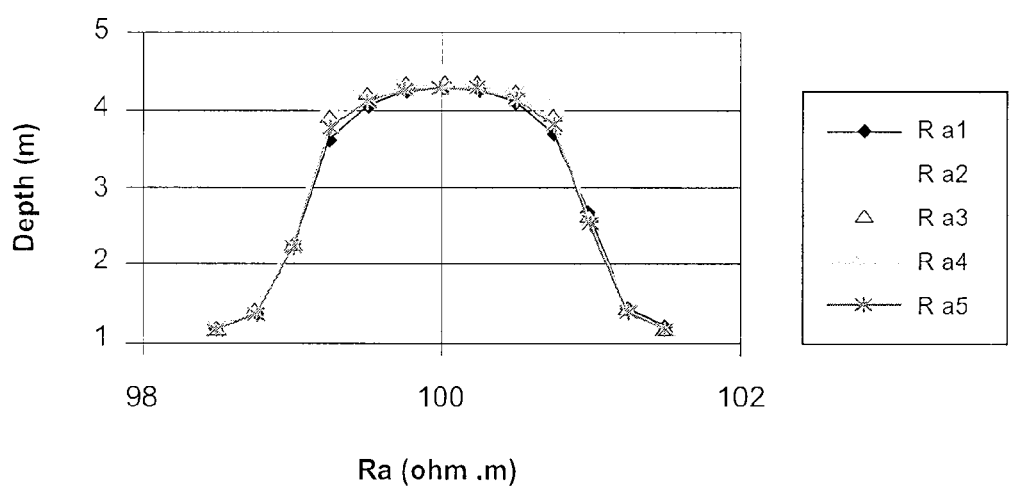
FIG. 11F shows simulated data using a conventional two-dimensional array laterolog tool, in accordance with various embodiments.

FIGS. 11A-11E show simulated data of 5 modes in the 3D formation model of FIGS. 10A and 10B with the 12 azimuthal electrode structure of main electrode A0 of FIG. 10B. FIGS. 11A-11E display the 3D formation resistivity changing. FIG. 11A corresponds to current pattern of Mode 1 above; FIG. 11B corresponds to current pattern of Mode 2 above; FIG. 11C corresponds to current pattern of Mode 3 above; FIG. 11D corresponds to current pattern of Mode 4 above; and FIG. 11E corresponds to current pattern of Mode 5 above. FIG. 11F shows simulated data effectively using a conventional 2D array laterolog tool, which allows for comparison with data FIGS. 11A-11E of the 12 azimuthal electrode structure of FIG. 10B. The formation model includes a borehole size equal to 8 inches having a resistivity of Rm equal to 0.1 ohm·m, a low resistivity layer having resistivity Rs equal to 1 ohm·m, and a high resistivity layer having resistivity Rt equal to 10 ohm·m with thickness H equal to 1 m at dipping angle equal to 70°. As indicated in FIGS. 11A-11E compared to FIG. 11F, the responses of the conventional 2D array laterolog tool do not provide data showing formation resistivity changes that can be provided by the tool having a main electrode with azimuthal electrodes arranged to be selectively operated.

Figure 12:
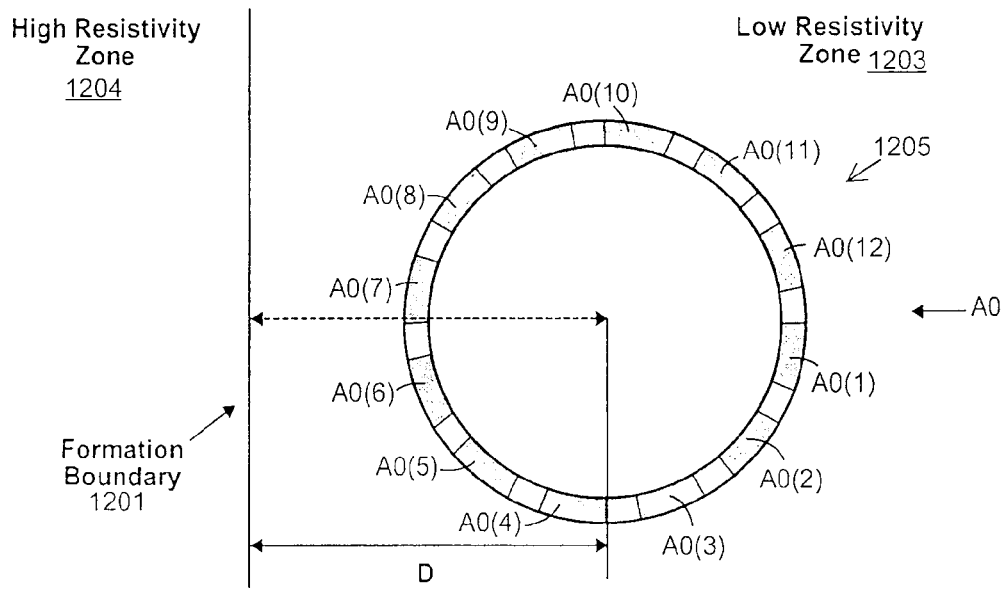
FIG. 12 shows a horizontal well model with a tool parallel with formation boundary, in accordance with various embodiments.

FIG. 12 shows a horizontal well model with a tool 1205 parallel with formation boundary 1201. The tool 1205 has a main electrode A0 having azimuthal electrodes A0(1) . . . A0(12). The horizontal well model includes a borehole size equal to 8 inches having a resistivity of Rm equal to 0.1 ohm·m, a low resistivity zone 1203 having resistivity Rs=1 ohm·m, and a high resistivity zone 1204 having resistivity Rt=10 ohm·m. Formation boundary 1201 separates a low resistivity zone 1203 from a high resistivity zone 1204. One or more of the electrodes A0(I) . . . A0(12) can face the boundary 1201 and one or more of the electrodes can face in a direction opposite the boundary 1201. For example, electrodes A0(6) and A0(7) of a main electrode A0 face the boundary 1201 and electrodes A0(1) and A0(12) face in a direction opposite the boundary 1201.

Figure 13A:
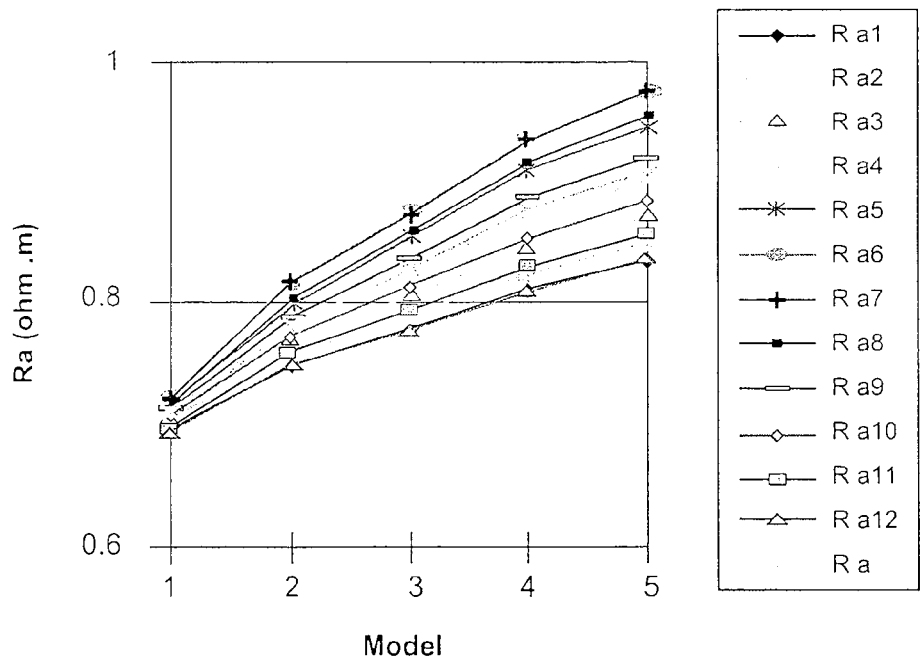
FIGS. 13A and 13B show simulated responses of an example three-dimensional array laterolog tool in horizontal well, in accordance with various embodiments.
Figure 13B:
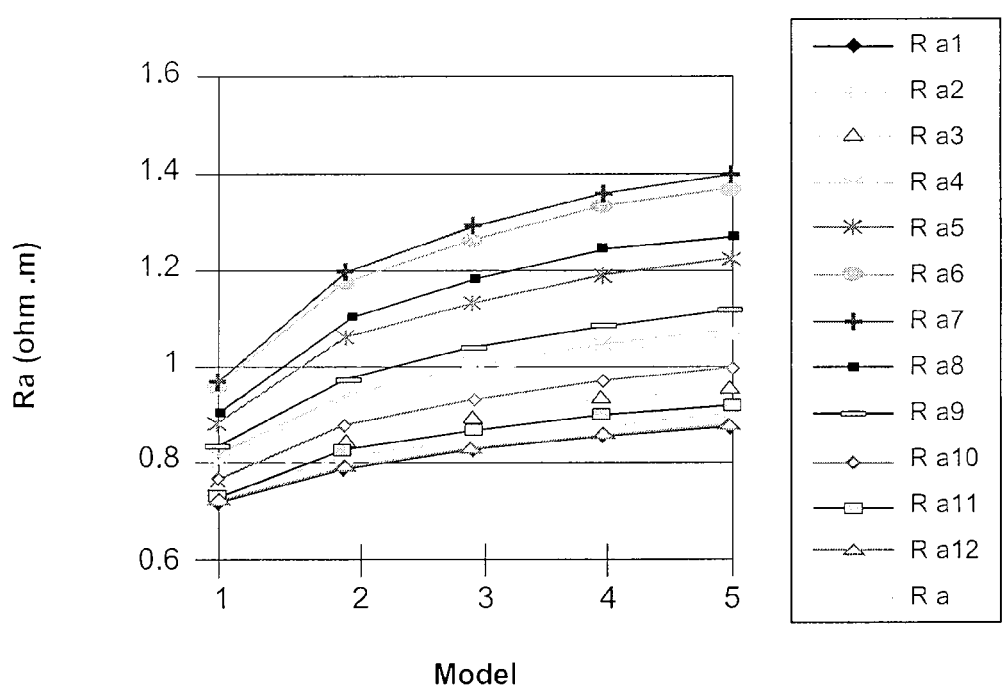

FIGS. 13A and 13B show simulated responses from an example embodiment of a 3D array laterolog tool in horizontal well. FIG. 13A and FIG. 13B show the results when distance to bed boundary (DTBB) are 0.8 m and 0.3 m, respectively. The horizontal axis represents operation modes used to generate the responses. The simulated results display the boundary effects on 12 azimuthal responses, which can be used to derive formation resistivity and boundary position.

In various embodiments, 3D focused array laterolog tools, in accordance with the teachings herein, offer three-dimensional formation resistivity profiles located at different radius, different azimuthal angles, and different logging positions. From the responses of such tools, formation resistivity distribution, dip angle, formation strike angle, and the tool's eccentricity and elliptic borehole can be identified directly. In addition, enhanced accuracy of formation resistivity and anisotropy can be computed by processing, such as inversion, responses from these tools. 3D focused array laterolog tools can be directed to providing solutions in deep water exploration to obtain structure dip, azimuth, $R_h$, and $R_v$.

Various components of a system including a tool having a main electrode, where the main electrode has a number of spaced apart electrodes within the main electrode, the spaced apart electrodes arranged azimuthally with respect to an axis of the tool; having a first number of electrodes to one side of the main electrode along the axis and a second number of electrodes on another side of the main electrode along the axis; and having a number of monitor electrodes arranged such that voltages are controlled with respect to current generated from the spaced apart electrodes of the main electrode, as described herein or in a similar manner, may be realized in combinations of hardware and software based implementations. These implementations may include a machine-readable storage device having machine-executable instructions, such as a computer-readable storage device having computer-executable instructions, to generate current from each electrode of a number of spaced apart electrodes within a main electrode of a tool disposed in a borehole, the spaced apart electrodes arranged azimuthally with respect to an axis of the tool and arranged with respect to a main monitor electrode for the main electrode; to control current from each of a first number of electrodes to one side of the main electrode along the axis and from each of a second number of electrodes on another side of the main electrode along the axis, the current controlled according to a selected current pattern; to monitor voltages in response to currents generated according to the selected current pattern; and to determine resistivity based on the monitored voltages and currents. The instructions can include instructions to manage the tool, determine formation resistivities, and direct drilling operations, such as but not limited to steering operations, based on the results of using the determined resistivities, in accordance with the teachings herein. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

Figure 14:
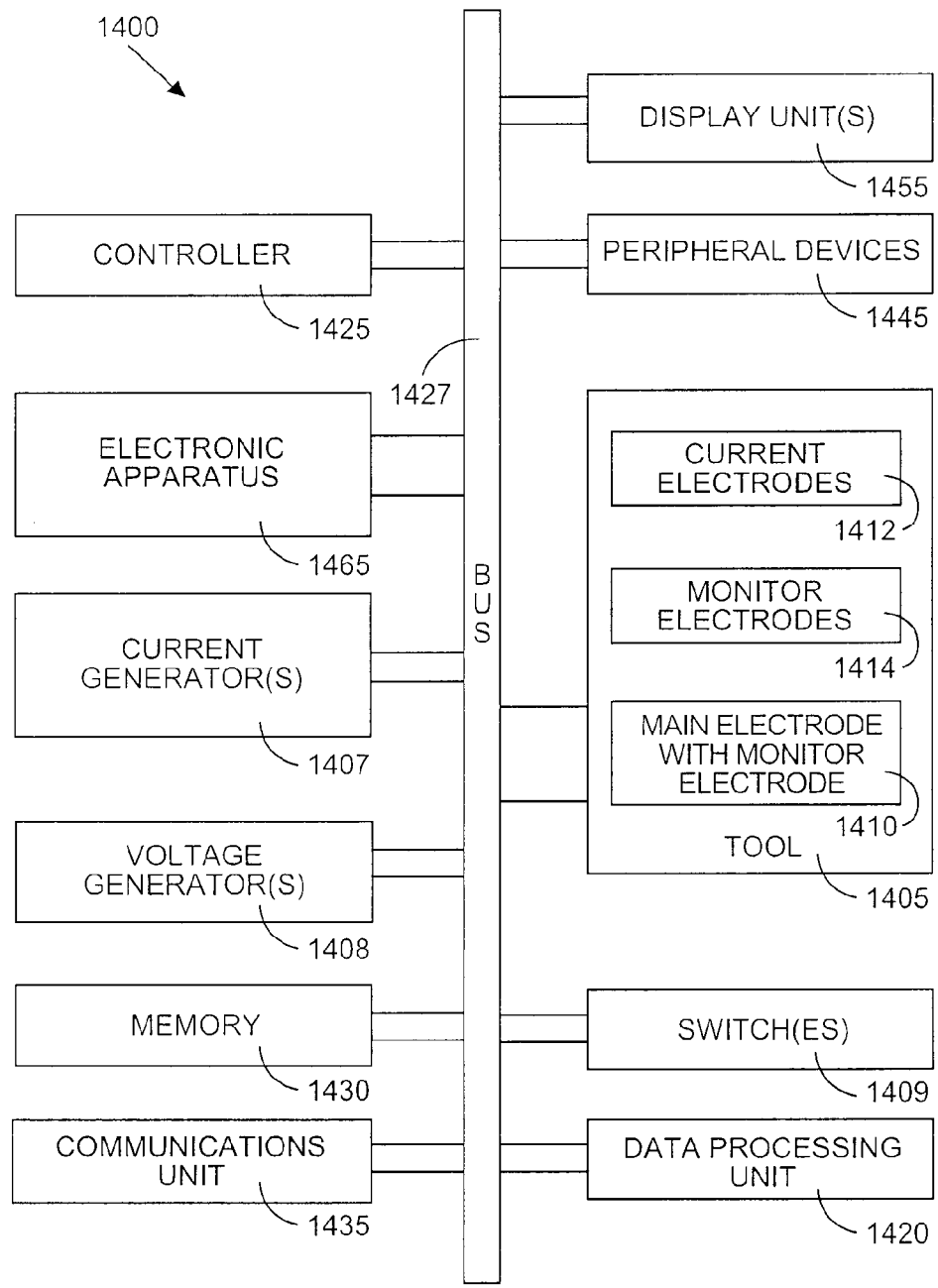
FIG. 14 depicts a block diagram of features of an example system having a tool configured with a main electrode having a number of azimuthal electrodes within the main electrode operable with electrodes arranged on the tool with respect to the main electrode, in accordance with various embodiments.

FIG. 14 depicts a block diagram of features of an example embodiment of a system 1400 having a tool 1405 including a main electrode having a number of azimuthal electrodes within the main electrode arranged with a monitor electrode, where the main electrode can be operable with electrodes arranged on the tool with respect to the main electrode along a longitudinal axis of the tool 1405. Azimuthal electrodes of the main electrode can be realized as a number of spaced apart electrodes arranged azimuthally with respect to the axis of the tool 1405. The system 1400 includes the tool 1405 having an arrangement of a main electrode 1410 with monitor electrode, current electrodes 1412, and monitor electrodes 1414 that can be realized in a similar or identical manner to arrangements of electrodes discussed herein. The system 1400 can be configured to operate in accordance with the teachings herein.

The system 1400 can include a controller 1425, a memory 1430, an electronic apparatus 1465, and a communications unit 1435. The controller 1425, the memory 1430, and the communications unit 1435 can be arranged to operate as a processing unit to control operation of the tool 1405, having an arrangement of the main electrode 1410 with monitor electrode, the current electrodes 1412, and the monitor electrodes 1414 to perform measurements in a borehole from which formation resistivity can be determined and management of a drilling operation can be conducted, in a manner similar or identical to the procedures discussed herein. Such a processing unit can be realized using a data processing unit 1420, which can be implemented as a single unit or distributed among the components of the system 1400 including the electronic apparatus 1465. The controller 1425 and the memory 1430 can operate to control activation of azimuthal electrodes of the main electrode 1410 and the current electrodes 1412 and selection of the monitor electrodes 1414 in the tool 1405 and to manage processing schemes in accordance with measurement procedures and signal processing as described herein. Generation of current from azimuthal electrodes of the main electrode 1410 and the current electrodes 1412 can be conducted using current generator(s) 1407. The current generator(s) 1407 can provide a reference current to the azimuthal electrodes of the main electrode 1410. The current from each azimuthal electrode to selected ones of the current electrodes 1412 may depend on the current path and homogeneity status of the formation material of the current path. Selection of particular current electrodes and focusing of current to selected current electrodes may be realized using voltage generator(s) 1408 and switch(es) 1409 in addition to the current generator(s) 1407. The system 1400 can be structured to function in a manner similar to or identical to structures associated with FIGS. 1-13.

The communications unit 1435 can include downhole communications for appropriately located electrodes. Such downhole communications can include a telemetry system. The communications unit 1435 may use combinations of wired communication technologies and wireless technologies at frequencies that do not interfere with on-going measurements.

The system 1400 can also include a bus 1427, where the bus 1427 provides electrical conductivity among the components of the system 1400. The bus 1427 can include an address bus, a data bus, and a control bus, each independently configured or in an integrated format. The bus 1427 can be realized using a number of different communication mediums that allows for the distribution of components of the system 1400. Use of the bus 1427 can be regulated by the controller 1425.

In various embodiments, the peripheral devices 1445 can include additional storage memory and/or other control devices that may operate in conjunction with the controller 1425 and/or the memory 1430. In an embodiment, the controller 1425 can be realized as a processor or a group of processors that may operate independently depending on an assigned function. The peripheral devices 1445 can be arranged with one or more displays 1455, as a distributed component on the surface, that can be used with instructions stored in the memory 1430 to implement a user interface to monitor the operation of the tool 1405 and/or components distributed within the system 1400. The user interface can be used to input operating parameter values such that the system 1400 can operate autonomously substantially without user intervention.

Figure 15:
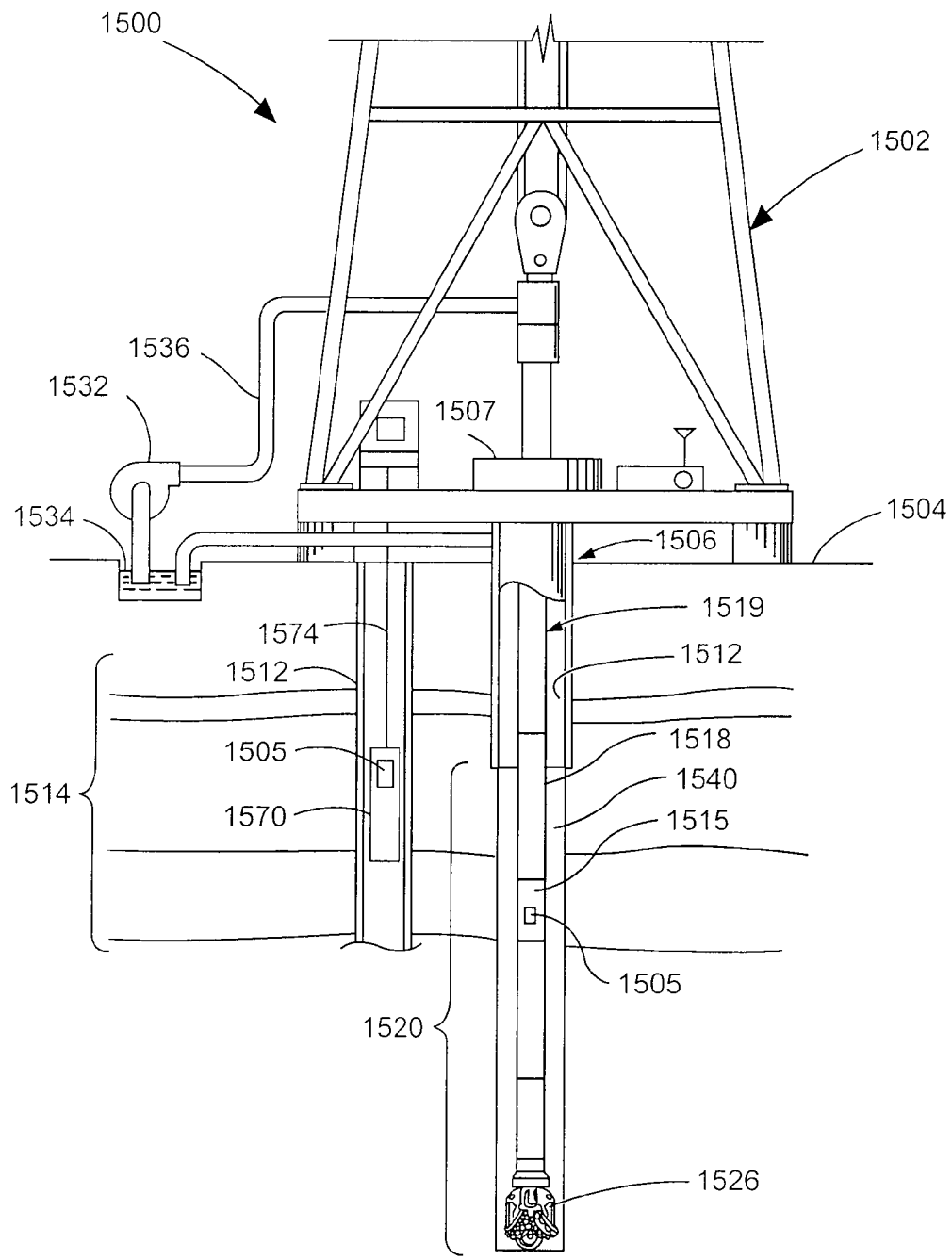
FIG. 15 depicts an example system at a drilling site, where the system includes a tool configured with a main electrode having a number of azimuthal electrodes within the main electrode operable with electrodes arranged on the tool with respect to the main electrode, in accordance with various embodiments.

FIG. 15 depicts an embodiment of a system 1500 at a drilling site, where the system 1500 includes a tool 1505 configured with a main electrode having a number of spaced apart electrodes within the main electrode such that the spaced apart electrodes are arranged azimuthally with respect to an axis of the tool. Generation of current from the spaced apart electrodes and control of current from additional electrodes on each side of the main electrode can provide for focused measurements. The system 1500 includes the tool 1505 having arrangements of electrodes that can be realized in a similar or identical manner to arrangements discussed herein. The system 1500 can be arranged in a land based drilling operation or a subsea drilling operation.

The system 1500 can include a drilling rig 1502 located at a surface 1504 of a well 1506 and a string of drill pipes, that is, the drill string 1508, connected together so as to form a drilling string that is lowered through a rotary table 1507 into a wellbore or borehole 1512. The drilling rig 1502 can provide support for the drill string 1508. The drill string 1508 can operate to penetrate rotary table 1507 for drilling a borehole 1512 through subsurface formations 1514. The drill string 1508 can include drill pipe 1518 and a bottom hole assembly 1520 located at the lower portion of the drill pipe 1518.

The bottom hole assembly 1520 can include drill collar 1515, the tool 1505 attached to the drill collar 1515, and a drill bit 1526. The drill bit 1526 can operate to create the borehole 1512 by penetrating the surface 1504 and the subsurface formations 1514. The tool 1505 can be structured for an implementation in the borehole 1512 of a well as a measurements-while-drilling (MWD) system such as a logging-while-drilling (LWD) system to determine formation resistivity, which can be used to direct drilling operations based on the determined resistivity. The housing containing the tool 1505 can include electronics to activate electrodes of the tool 1505 and collect responses from electrodes of the tool 1505. Such electronics can include a data processing unit to analyze signals received by the tool 1505 and provide measurement results of resistivity to the surface over a standard communication mechanism for operating a well. Alternatively, electronics can include a communications interface to provide signals measured by the tool 1505 to the surface over a standard communication mechanism for operating a well, where these measured signals can be analyzed at a processing unit at the surface.

During drilling operations, the drill string 1508 can be rotated by the rotary table 1507. In addition to, or alternatively, the bottom hole assembly 1520 can also be rotated by a motor (e.g., a mud motor) that is located downhole. The drill collars 1515 can be used to add weight to the drill bit 1526. The drill collars 1515 also can stiffen the bottom hole assembly 1520 to allow the bottom hole assembly 1520 to transfer the added weight to the drill bit 1526, and in turn, assist the drill bit 1526 in penetrating the surface 1504 and subsurface formations 1514.

During drilling operations, a mud pump 1532 can pump drilling fluid (sometimes known by those of skill in the art as "drilling mud") from a mud pit 1534 through a hose 1536 into the drill pipe 1518 and down to the drill bit 1526. The drilling fluid can flow out from the drill bit 1526 and be returned to the surface 1504 through an annular area 1540 between the drill pipe 1518 and the sides of the borehole 1512. The drilling fluid may then be returned to the mud pit 1534, where such fluid is filtered. In some embodiments, the drilling fluid can be used to cool the drill bit 1526, as well as to provide lubrication for the drill bit 1526 during drilling operations. Additionally, the drilling fluid may be used to remove the subsurface formation 1514 cuttings created by operating the drill bit 1526.

In various embodiments, the tool 1505 may be included in a tool body 1570 coupled to a logging cable 1574 such as, for example, for wireline applications. The tool body 1570 containing the tool 1505 can include electronics to activate electrodes of the tool 1505 and collect responses from electrodes of the tool 1505. Such electronics can include a data processing unit to analyze signals measured by the tool 1505 and provide measurement results of resistivity to the surface over a standard communication mechanism for operating a well. Alternatively, electronics can include a communications interface to provide signals measured by the tool 1505 to the surface over a standard communication mechanism for operating a well, where these collected measurement signals are analyzed at a processing unit at the surface. The logging cable 1574 may be realized as a wireline (multiple power and communication lines), a mono-cable (a single conductor), and/or a slick-line (no conductors for power or communications), or other appropriate structure for use in the bore hole 1512. Although not shown, the tool body 1570 can be used in the same borehole 1512 as the bottom hole assembly 1520.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. An apparatus comprising:
    a main electrode of a tool, the main electrode having a number of spaced apart electrodes within the main electrode, the spaced apart electrodes arranged azimuthally with respect to an axis of the tool;
    a first number of electrodes to one side of the main electrode along the axis and a second number of electrodes on another side of the main electrode along the axis;
    a number of monitor electrodes arranged along the axis of the tool from the main electrode such that voltages to the number of monitor electrodes are operatively controlled with respect to current operatively generated from the spaced apart electrodes of the main electrode; and
    a control unit to operatively control generation of a current pattern selected from a plurality of modes, each mode having current generated from the main electrode, from one or more electrodes of the first number of electrodes to only one non-current generating electrode of the first number of electrodes, the one non-current generating electrode operatively selected according to the mode, and from one or more electrodes of the second number of electrodes to only one non-current generating electrode of the second number of electrodes, the one non-current generating electrode operatively selected according to the mode, wherein at least one mode of the plurality of the modes has a plurality of non-current generating electrodes selected from each of the first number of electrodes and the second number of electrodes.

2. The apparatus of claim 1, wherein the main electrode includes a main monitor electrode separated from the spaced apart electrodes by an insulator.

3. The apparatus of claim 2, wherein the insulator separates a first spaced apart electrode from a second spaced electrode within the main electrode.

4. The apparatus of claim 1, wherein the number of spaced apart electrodes equals two or more, the spaced apart electrodes wrapped around the axis of the tool.

5. The apparatus of claim 1, wherein each one of the first number of electrodes is coupled to a corresponding one of the second number of electrodes.

6. The apparatus of claim 1, wherein the control unit is arranged to selectively control the first number of electrodes and the second number of electrodes such that selected ones of the first number of electrodes and the second number of electrodes receive current from the spaced apart electrodes of the main electrode.

7. The apparatus of claim 6, wherein the control unit is arranged to generate current from other selected ones of the first number of electrodes and the second number of electrodes based on a selected current pattern.

8. The apparatus of claim 7, wherein the control unit is arranged to adjust the current such that a potential difference between selected ones of the monitored electrodes equals a reference potential.

9. The apparatus of claim 1, wherein the apparatus includes a control unit to selectively control the main electrode, the first number of electrodes, and the second number of electrodes to generate a current pattern, k, such that a monitor electrode, M0, for the main electrode has a reference potential, $VM0_k$, for each current pattern k, $VM0_k$ given by $$VM0_k = \frac{\sum_{i=1}^{N} VM0(k,i)}{N},$$

where N equals the number of spaced apart electrodes of the main electrode and where VM0(k,i) is the potential at M0 for the current pattern k for spaced apart electrode i, i=1, ..., N.

10. The apparatus of claim 9, wherein the apparatus includes a data processing unit to process measured voltages to generate a resistivity, R(k,i) for the current pattern k for the $i^{th}$ spaced apart electrode, R(k,i) given by $$R(k,i) = Kk \frac{\sum_{j=1}^{N} VM1(k,j) * C(k,j)}{N * IA0(k,i)} (i=1, \ldots, N),$$

where VM1(k,j) is a potential at monitor electrode M1 for the current pattern k for the $j^{th}$ spaced apart electrode in the summation, Kk is a tool coefficient for the current pattern k, C(k, j) is a coefficient of the $j^{th}$ spaced apart electrode for the current pattern k, C(k,j) given by $$C(k,j) = \frac{VM0_k}{VM0(k,j)} (j=1, \ldots, N),$$

and IA0(k, i) is the current from the $i^{th}$ spaced apart electrode of the main electrode, A0, for the $k^{th}$ current pattern, IA0(k, i) given by IA0(k, i)=C(k, i)*I0, (i=1, ..., N), I0 being reference current.

11. A method comprising:

generating current from each electrode of a number of spaced apart electrodes within a main electrode of a tool disposed in a borehole, the spaced apart electrodes arranged azimuthally with respect to an axis of the tool, the spaced apart electrodes arranged with respect to a main monitor electrode for the main electrode;

controlling current from each of a first number of electrodes to one side of the main electrode and from each of a second number of electrodes on another side of the main electrode, the current controlled according to a selected current pattern, the selected current pattern selected from a plurality of modes, each mode having current generated from the main electrode, from one or more electrodes of the first number of electrodes to only one non-current generating electrode of the first number of electrodes, the one non-current generating electrode operatively selected according to the selected current pattern, and from one or more electrodes of the second number of electrodes to only one non-current generating electrode of the second number of electrodes, the one non-current generating electrode operatively selected according to the selected current pattern, wherein at least one mode of the plurality of the modes has a plurality of non-current generating electrodes selected from each of the first number of electrodes and the second number of electrodes;

monitoring voltages in response to currents generated according to the selected current pattern; and determining resistivity based on the monitored voltages and the currents generated according to the selected current pattern.

12. The method of claim 11, wherein the method includes adjusting potentials on monitor electrodes such that the main monitor electrode of the main electrode has a reference potential for all spaced apart electrodes arranged azimuthally.

13. The method of claim 12, wherein the reference potential of the main monitor electrode, M0, is set according to a current pattern, k, generated by controlling the potentials and currents such that the reference potential, $VM0_k$, of the main monitor electrode for each current pattern k, is given by $$VM0_k = \frac{\sum_{i=1}^{N} VM0(k,i)}{N},$$

where N equals the number of spaced apart electrodes of the main electrode and VM0(k, i) is the potential at M0 for the current pattern k for spaced apart electrode i, i=1, ..., N.

14. The method of claim 13, wherein determining resistivity includes using measured voltages to generate a resistivity, R(k,i) for the current pattern k for the $i^{th}$ spaced apart electrode, R(k,i) given by $$R(k, i) = Kk \frac{\sum_{j=1}^{N} VM1(k, j) * C(k, j)}{N * IA0(k, i)} (i = 1, \ldots, N),$$

where $VM1(k,j)$ is a potential at a monitor electrode M1 for the current pattern k for the $j^{th}$ spaced apart electrode in the summation, Kk is a tool coefficient for current pattern k, $C(k,j)$ is a coefficient of spaced apart electrode j for current pattern k, $C(k,j)$ given by $$C(k, j) = \frac{VM0_k}{VM0(k, j)} (j = 1, \ldots, N),$$

and $IA0(k,i)$ is the current from the $i^{th}$ spaced apart electrode of the main electrode, A0, for the $k^{th}$ current pattern, $IA0(k,i)$ given by $IA0(k,i) = C(k,i)*I0$, $(i=1, \ldots, N)$, I0 being reference current.

15. The method of claim 11, wherein generating current and controlling current includes generating the selected current pattern with the first number of electrodes disposed in a first sequence from the main electrode and with the second number of electrodes disposed in a second sequence from the main electrode such that the generating of the current pattern includes:
   generating the current from each azimuthal electrode of the main electrode to a second electrode in the first sequence and to a second electrode in the second sequence, the current based on a reference current; and
   controlling current from a first electrode in the first sequence to the second electrode in the first sequence and controlling current from a first electrode in the second sequence to the second electrode in the second sequence such that remaining electrodes in the first sequence and in the second sequence do not emit current.

16. A method of claim 11, generating current and controlling current includes generating the selected current pattern with the first number of electrodes disposed in a first sequence from the main electrode and with the second number of electrodes disposed in a second sequence from the main electrode such that the generating of the current pattern includes:
   generating the current from each azimuthal electrode of the main electrode to a third electrode in the first sequence and to a third electrode in the second sequence, the current based on a reference current; and
   controlling current from a first electrode in the first sequence to the third electrode in the first sequence, controlling current from a second electrode in the first sequence to the third electrode in the first sequence, controlling current from a first electrode in the second sequence to a third electrode in the second sequence, and controlling current from a second electrode in the second sequence to the third electrode in the second sequence such that remaining electrodes in the first sequence and in the second sequence do not emit current.

17. A method of claim 11, generating current and controlling current includes generating the selected current pattern with the first number of electrodes disposed in a first sequence from the main electrode and with the second number of electrodes disposed in a second sequence from the main electrode such that the generating of the current pattern includes:
   generating the current from each azimuthal electrode of the main electrode to a fourth electrode in the first sequence and to a corresponding fourth electrode in the second sequence, the current based on a reference current; and
   controlling current from a first electrode in the first sequence to the fourth electrode in the first sequence, controlling current from a second electrode in the first sequence to the fourth electrode in the first sequence, controlling current from a third electrode in the first sequence to the fourth electrode in the first sequence, controlling current from a first electrode in the second sequence to a fourth electrode in the second sequence, controlling current from a second electrode in the second sequence to the fourth electrode in the second sequence, and controlling current from a third electrode in the second sequence to the fourth electrode in the second sequence such that remaining electrodes in the first sequence and in the second sequence do not emit current.

18. A method of claim 11, wherein generating current and controlling current includes generating the selected current pattern with the first number of electrodes disposed in a first sequence from the main electrode and with the second number of electrodes disposed in a second sequence from the main electrode such that the generating of the current pattern includes:
   generating the current from each azimuthal electrode of the main electrode to a fifth electrode in the first sequence and to a corresponding fifth electrode in the second sequence, the current based on a reference current; and
   controlling current from a first electrode in the first sequence to the fifth electrode in the first sequence, controlling current from a second electrode in the first sequence to the fifth electrode in the first sequence, controlling current from a third electrode in the first sequence to the fifth electrode in the first sequence, controlling current from a fourth electrode in the first sequence to the fifth electrode in the first sequence, controlling current from a first electrode in the second sequence to a fifth electrode in the second sequence, controlling current from a second electrode in the second sequence to the fifth electrode in the second sequence, controlling current from a third electrode in the second sequence to the fifth electrode in the second sequence, and controlling current from a fourth electrode in the second sequence to the fifth electrode in the second sequence such that remaining electrodes in the first sequence and in the second sequence do not emit current.

19. A method of claim 11, wherein generating current and controlling current includes generating the selected current pattern with the first number of electrodes disposed in a first sequence from the main electrode and with the second number of electrodes disposed in a second sequence from the main electrode such that the generating of the current pattern includes:
   generating the current from each azimuthal electrode of the main electrode to a sixth electrode in the first sequence and to a corresponding sixth electrode in the second sequence, the current based on a reference current; and
   controlling current from a first electrode in the first sequence to the sixth electrode in the first sequence, controlling current from a second electrode in the first sequence to the sixth electrode in the first sequence, controlling current from a third electrode in the first sequence to the sixth electrode in the first sequence, controlling current from a fourth electrode in the first sequence to the sixth electrode in the first sequence, controlling current from a fifth electrode in the first sequence to the sixth electrode in the first sequence, controlling current from a first electrode in the second sequence to a sixth electrode in the second sequence, controlling current from a second electrode in the second sequence to the sixth electrode in the second sequence, controlling current from a third electrode in the second sequence to the sixth electrode in the second sequence, controlling current from a fourth electrode in the second sequence to the sixth electrode in the second sequence, and controlling current from a fifth electrode in the second sequence to the sixth electrode in the second sequence such that remaining electrodes in the first sequence and in the second sequence do not emit current.

20. A non-transitory machine-readable storage device having instructions stored thereon, which, when performed by a machine, cause the machine to perform operations, the operations comprising:
   generating current from each electrode of a number of spaced apart electrodes within a main electrode of a tool disposed in a borehole, the spaced apart electrodes arranged azimuthally with respect to an axis of the tool, the spaced apart electrodes arranged with respect to a main monitor electrode for the main electrode;
   controlling current from each of a first number of electrodes to one side of the main electrode and from each of a second number of electrodes on another side of the main electrode, the current controlled according to a selected current pattern, the selected current pattern selected from a plurality of modes, each mode having current generated from the main electrode, from one or more electrodes of the first number of electrodes to only one non-current generating electrode of the first number of electrodes, the one non-current generating electrode operatively selected according to the selected current pattern, and from one or more electrodes of the second number of electrodes to only one non-current generating electrode of the second number of electrodes, the one non-current generating electrode operatively selected according to the selected current pattern, wherein at least one mode of the plurality of the modes has a plurality of non-current generating electrodes selected from each of the first number of electrodes and the second number of electrodes;
   monitoring voltages in response to currents generated according to the selected current pattern; and
   determining resistivity based on the monitored voltages and the currents generated according to the selected current pattern.

21. The non-transitory machine-readable storage device of claim 20, wherein generating current and controlling current includes generating the selected current pattern with the first number of electrodes disposed in a first sequence from the main electrode and with the second number of electrodes disposed in a second sequence from the main electrode such that the generating of the current pattern includes:
   generating the current from each azimuthal electrode of the main electrode to a second electrode in the first sequence and to a second electrode in the second sequence, the current based on a reference current; and
   controlling current from a first electrode in the first sequence to the second electrode in the first sequence and controlling current from a first electrode in the second sequence to the second electrode in the second sequence such that remaining electrodes in the first sequence and in the second sequence do not emit current.

22. A method comprising:
determining formation resistivity by operating an apparatus including:
   a main electrode of a tool, the main electrode having a number of spaced apart electrodes within the main electrode, the spaced apart electrodes arranged azimuthally with respect to an axis of the tool;
   a first number of electrodes to one side of the main electrode along the axis and a second number of electrodes on another side of the main electrode along the axis;
   a number of monitor electrodes arranged along the axis of the tool from the main electrode such that voltages to the number of monitor electrodes are operatively controlled with respect to current operatively generated from the spaced apart electrodes of the main electrode; and
   a control unit to operatively control generation of a current pattern selected from a plurality of modes, each mode having current generated from the main electrode, from one or more electrodes of the first number of electrodes to only one non-current generating electrode of the first number of electrodes, the one non-current generating electrode operatively selected according to the mode, and from one or more electrodes of the second number of electrodes to only one non-current generating electrode of the second number of electrodes, the one non-current generating electrode operatively selected according to the mode, wherein at least one mode of the plurality of the modes has a plurality of non-current generating electrodes selected from each of the first number of electrodes and the second number of electrodes, wherein the formation resistivity is determined based on the generated current from the spaced apart electrodes of the main electrode and the monitored voltages.

23. A system comprising:
   a main electrode of a tool, the main electrode having a number of spaced apart electrodes within the main electrode, the spaced apart electrodes arranged azimuthally with respect to an axis of the tool;
   a first number of electrodes to one side of the main electrode along the axis and a second number of electrodes on another side of the main electrode along the axis; and
   a number of monitor electrodes arranged along the axis of the tool from the main electrode such that voltages to the number of monitor electrodes are operatively controlled with respect to current generated from the spaced apart electrodes of the main electrode, wherein the system is arranged to:
      generate current from each electrode of a number of spaced apart electrodes within the main electrode of the tool disposed in a borehole, the spaced apart electrodes arranged azimuthally with respect to an axis of the tool, the spaced apart electrodes arranged with respect to a main monitor electrode for the main electrode;
      control current from each of the first number of electrodes and from each of the second number of electrodes, the current controlled according to a selected current pattern, the selected current pattern selected from a plurality of modes, each mode having current generated from the main electrode, from one or more electrodes of the first number of electrodes to only one non-current generating electrode of the first number of electrodes, the one non-current generating electrode operatively selected according to the selected current pattern, and from one or more electrodes of the second number of electrodes to only one non-current generating electrode of the second number of electrodes, the one non-current generating electrode operatively selected according to the selected current pattern, wherein at least one mode of the plurality of the modes has a plurality of non-current generating electrodes selected from each of the first number of electrodes and the second number of electrodes;

monitor voltages in response to currents generated according to the selected current pattern; and determine resistivity based on the monitored voltages and the currents generated according to the selected current pattern.

24. The non-transitory machine-readable storage device of claim 20, wherein the operations include adjusting potentials on monitor electrodes such that the main monitor electrode of the main electrode has a reference potential for all spaced apart electrodes arranged azimuthally.

25. The non-transitory machine-readable storage device of claim 24, wherein the reference potential of the main monitor electrode, M0, is set according to a current pattern, k, generated by controlling the potentials and currents such that the reference potential, $VM0_k$, of the main monitor electrode for each current pattern k, is given by $$VM0_k = \frac{\sum_{i=1}^{N} VM0(k, i)}{N},$$

where N equals the number of spaced apart electrodes of the main electrode and VM0(k,i) is the potential at M0 for the current pattern k for spaced apart electrode i, i=1, ..., N.

26. The non-transitory machine-readable storage device of claim 25, wherein wherein determining resistivity includes using measured voltages to generate a resistivity, R(k,i) for the current pattern k for the $i^{th}$ spaced apart electrode, R(k,i) given by $$R(k, i) = Kk \frac{\sum_{j=1}^{N} VM1(k, j) * C(k, j)}{N * IA0(k, i)} (i = 1, \ldots, N),$$

where VM1(k,j) is a potential at a monitor electrode M1 for the current pattern k for the $j^{th}$ spaced apart electrode in the summation, Kk is a tool coefficient for current pattern k, C(k,j) is a coefficient of spaced apart electrode j for current pattern k, C(k,j) given by $$C(k, j) = \frac{VM0_k}{VM0(k, j)} (j = 1, \ldots, N),$$

and IA0(k,i) is the current from the $i^{th}$ spaced apart electrode of the main electrode, A0, for the $k^{th}$ current pattern, IA0(k,i) given by IA0(k,i)=C(k,i)*I0, (i=1, ..., N), I0 being reference current.

* * * * *